Aug. 30, 1949.  A. G. BODINE, JR  2,480,626
RESONANT WAVE PULSE ENGINE AND PROCESS
Filed Nov. 3, 1947  5 Sheets-Sheet 2

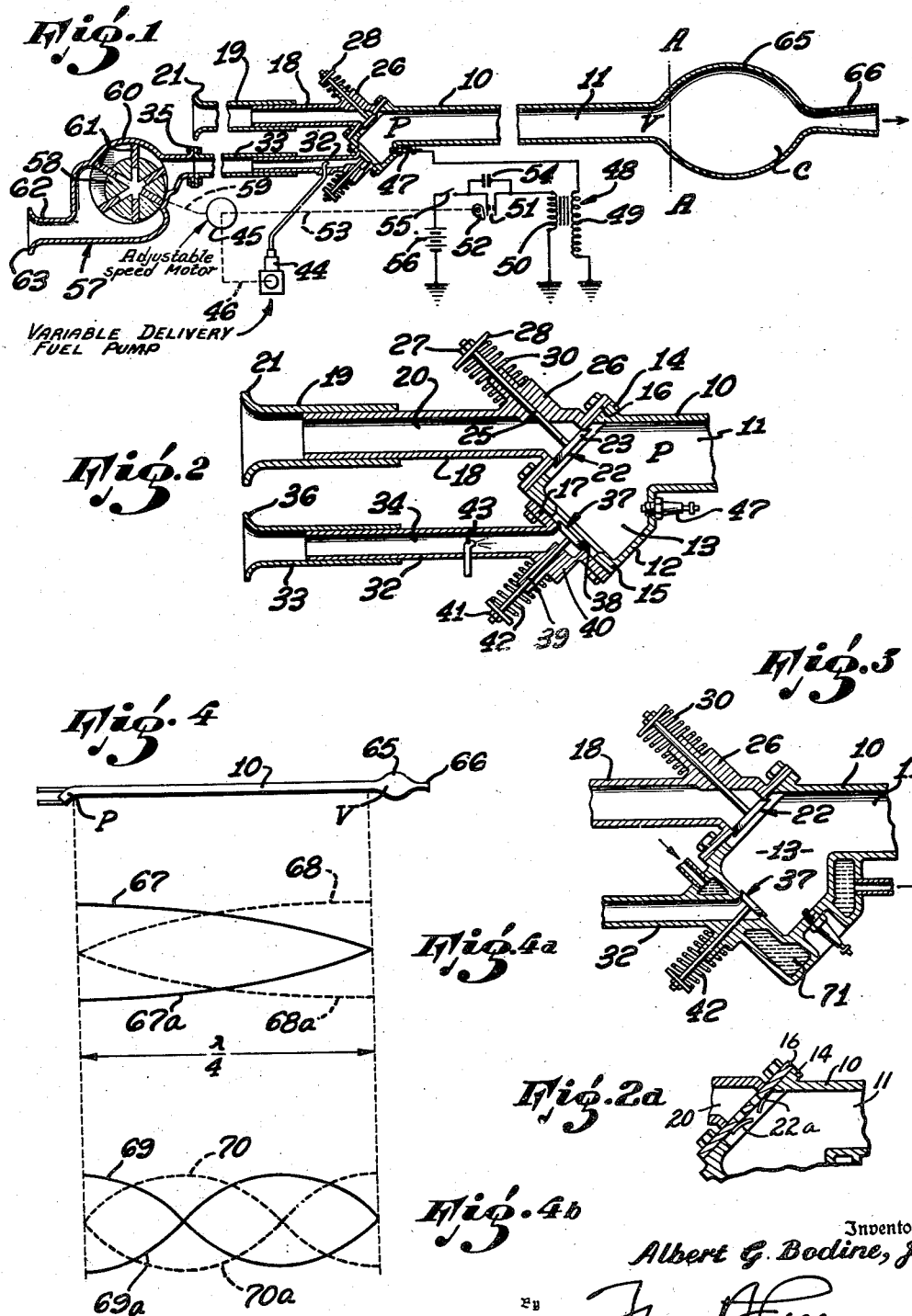

Inventor
Albert G. Bodine, Jr.
By
Attorney

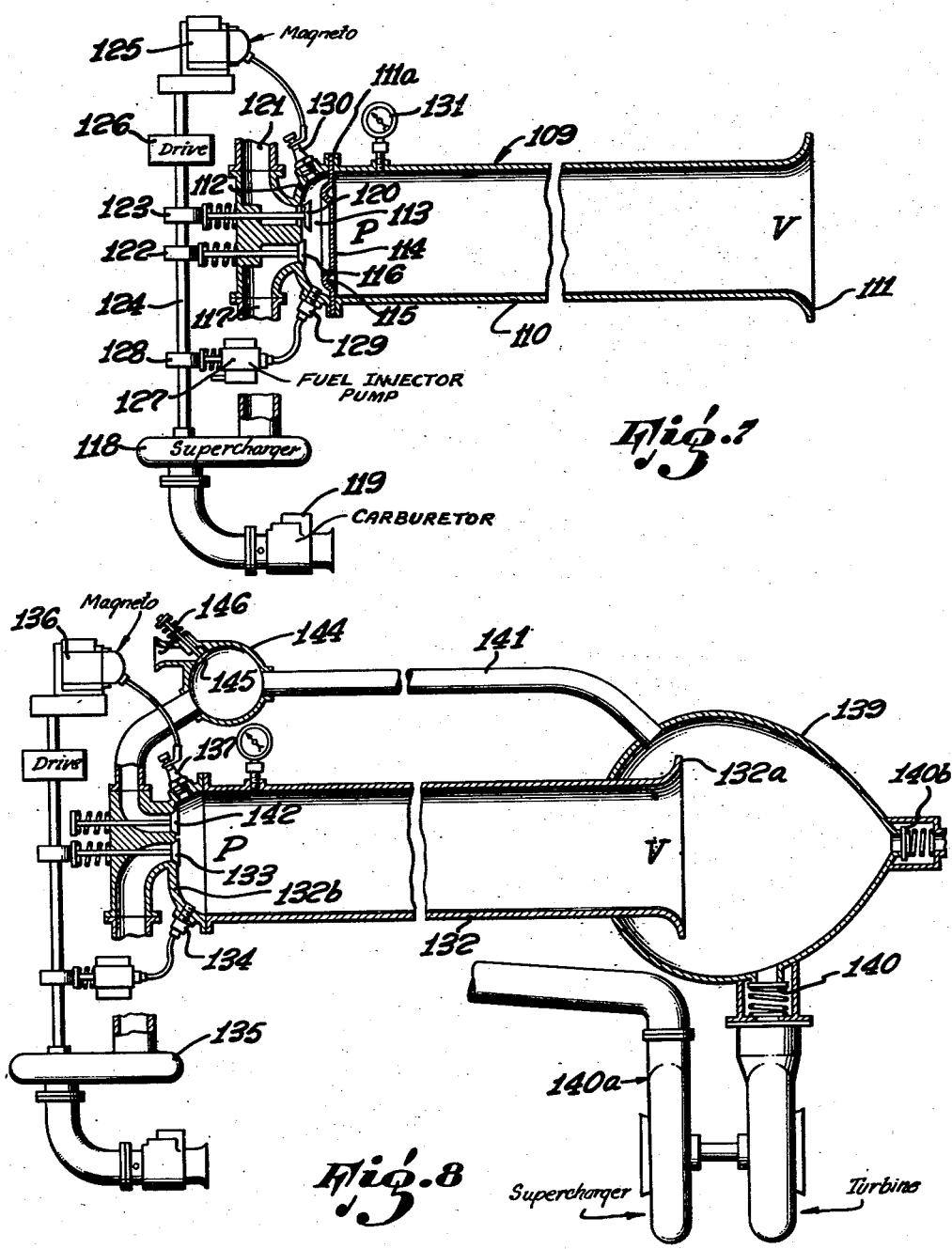

Aug. 30, 1949.  A. G. BODINE, JR  2,480,626
RESONANT WAVE PULSE ENGINE AND PROCESS
Filed Nov. 3, 1947  5 Sheets-Sheet 4

Inventor
Albert G. Bodine, Jr.
By
Attorney

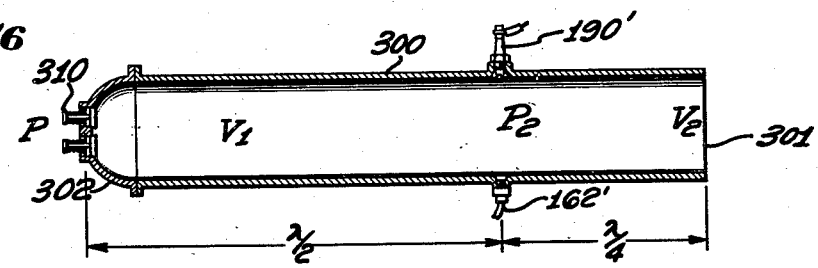
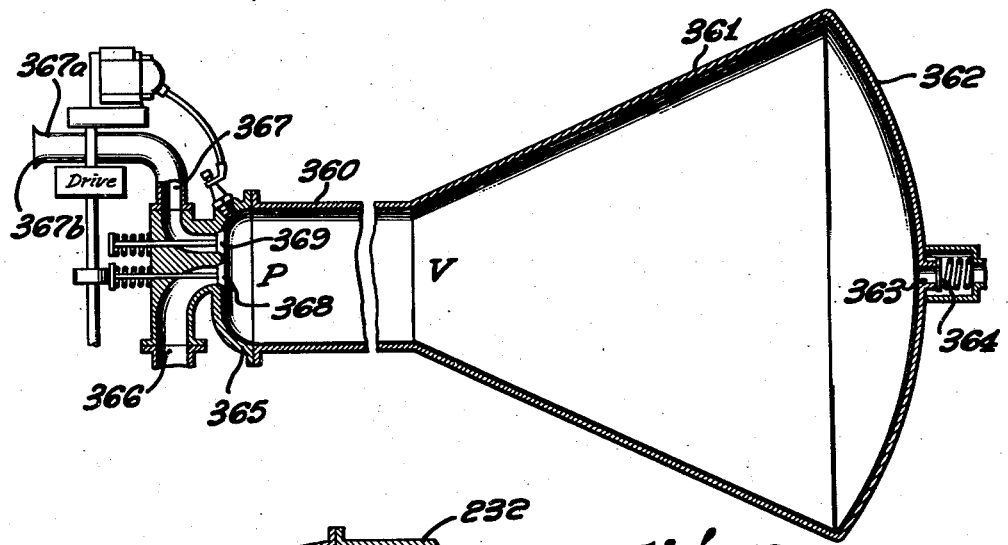
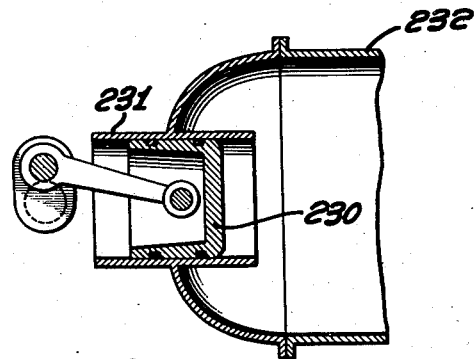

Patented Aug. 30, 1949

2,480,626

UNITED STATES PATENT OFFICE 2,480,626

RESONANT WAVE PULSE ENGINE AND PROCESS

Albert G. Bodine, Jr., Van Nuys, Calif.

Application November 3, 1947, Serial No. 783,662

42 Claims. (Cl. 60—35.6)

This invention relates generally to resonant wave pulse engines of the sonic standing wave type employing, in part, the principles of sonic wave radiation pressure as set forth in my copending prior applications entitled Method and apparatus for generating a controlled thrust, Serial No. 439,926, filed April 21, 1942; Method and apparatus for jet propulsion, Serial No. 521,575, filed February 8, 1944, and Acoustic method and apparatus for transforming energy, Serial No. 589,754, filed April 23, 1945, of and for which several prior applications, now abandoned, the present application is a continuation-in-part and substitution.

Engines of the class to which the present invention belongs have their primary present application in the field of jet propulsion, and in such application they may be classified with engines of the type now known as impulse jet engines. They are, however, not restricted to such use, and may equally well be employed as blowers, pumps, compressors, or for other purposes. Accordingly, while the present invention is, for simplicity, disclosed herein in forms primarily intended for propulsion, and with propulsion chiefly in view, no limitation thereto is to be implied, and the appended claims which are not expressly restricted to propulsion applications are to be read with this understanding.

The invention, in one of its aspects, comprehends a method and apparatus for utilizing the radiation or impact pressure of elastic waves and employs principles of sonics as a foundation, it being clear that the term "sonics" as herein used has reference to sonic principles and not necessarily to employment of frequencies within the audible range of the average human ear. By way of example, I may generate sonic longitudinal waves in an elastic medium with such a wave pattern as to cause these waves to exert a resultant propulsive force or thrust against the reflecting surface of a quarter-wave housing or cavity containing the elastic medium, and it is an object of the invention to provide such a system.

In another aspect, it is a general object of the invention to provide an improved method and apparatus for jet propulsion, relying upon the thrust reaction obtained from mass discharge of fluids, and applying the principles of substantially quarter wave standing wave resonance for improvement of the jet, increase in the mass rate of jet discharge, and increase in over-all efficiency.

In still another aspect, it is a general object of the invention to provide a novel and improved compressor, blower or pump, relying upon principles of standing wave resonance in substantially quarter-wave resonated pipes or cavities to permit avoidance of the use of mechanical pistons, and to yield high efficiencies.

In a prior type of jet propulsion apparatus, a pipe was employed having one end closed and one end open. Products of internal combustion were jetted from the open end or "tail" of this pipe, and propulsion resulted from the reaction on the pipe as a result of this jet discharge. The propulsive force in such an apparatus is proportional to the mass of discharged products of combustion per unit time multiplied by the velocity of the jet. Such an engine in its elementary form is notoriously inefficient. High peak combustion chamber pressures are required for thermal efficiency, as the high expansion ratios necessary to such efficiency are determined by the ratio between peak combustion chamber pressure and atmospheric pressure. High combustion chamber pressures result however in excessively high jet discharge pressures, which in turn produce very high jet velocities, giving rise to poor propulsion efficiency. This system also leads to a relatively small mass flow of high velocity products of combustion, which is extremely uneconomical of fuel for the propulsion effort achieved. The present invention, in one aspect, has as an object the application of the principles of sonics and quarter-wave standing wave resonance to such an engine, whereby a number of highly important improvements are gained, including, among other things, the achievement of high propulsion and thermal efficiencies, and improved fuel economy. The many specific objects of the invention are too numerous to recite in detail. Some of them will be mentioned hereinafter, but many more will be left to be gathered or inferred from the ensuing description of the invention.

Characteristically, the engine of the present invention, in one elementary form, has a resonant cavity or housing typically in the form of a pipe, usually cylindrical, but not necessarily so, closed at one end and open, i. e., provided with a fluid discharge orifice, at the other. This orifice may discharge to atmosphere, or into an enlarged chamber, and the latter when used may have a discharge orifice to atmosphere. Alternatively, for purposes other than jet propulsion, as for instance pumping, compressing, and the like, the discharge orifice may be coupled to conduits leading to storage chambers, turbines, or the like.

The pipe defines a fluid column in which a standing wave pattern is established by means of intermittent pressure pulses created at the closed end of the pipe, these being preferably produced by intermittent combustion of fuel charges introduced to the closed end of the pipe. The intermittent combustion is timed to a frequency corresponding preferably to the fundamental frequency of the pipe considered as a quarter-wave organ pipe. In accordance with quarter-wave organ pipe theory, the intermittent pressure pulses so produced serve to resonate the fluid column, creating a pressure anti-node (zone of maximum pressure variation and minimum fluid particle velocity variation) adjacent the closed end of the pipe, and a velocity anti-node (zone of maximum fluid particle velocity variation and minimum pressure variation) adjacent the discharge orifice at the other end of the pipe. The pipe may be straight, i. e., uniform cross-section throughout, in which case its length will be one-quarter the wave length corresponding to its resonant frequency; or it may diverge, or converge, or have other shapes, in which case it may no longer be precisely a quarter-wave in length. It will, however, generally speaking, still have quarter-wave character; that is to say, there will be a pressure anti-node adjacent its closed end and a velocity anti-node adjacent its open or discharge end.

The mechanism by which the pressure and velocity anti-nodes of the preceding paragraph are established is as follows: The cycle may begin with a positive pressure pulse within the closed end portion of the pipe. This positive pressure pulse acts immediately upon the closed end of the pipe, and it also launches a wave of condensation in the fluid which travels along the fluid column in the pipe with the velocity of sound in the fluid. Reaching the open end of the pipe, a quarter cycle after starting, the positive pressure wave is expanded thereby and experiences "inverse reflection"; that is to say, the wave is reflected by the open end as a negative pressure wave, or wave of rarefaction, traveling back up the pipe toward the closed end. This wave of rarefaction reaches the closed end of the pipe one-half cycle after the initial creation of the positive pressure pulse, at which time the closed end of the pipe is experiencing a pressure depression below mean static pressure resulting from the fact that the fluid is elastic and a compression, later relieved by advancing toward the far end, tends to create a rarefaction adjacent the point of origin, which rarefaction is independent of any reflected wave of rarefaction returning to the origin. The reflected wave of rarefaction occurring at the closed end of the pipe reinforces and augments the described pressure depression. This wave of rarefaction then immediately experiences "like-kind" reflection, or in other words, is reflected by the closed end of the pipe, functioning as a wave reflector, as a wave of rarefaction traveling toward the open end of the pipe, which it reaches three-quarters of the cycle after its beginning. The wave of rarefaction then experiences inverse reflection, so that a wave of condensation now returns up the pipe toward the closed end, to complete the cycle. If the arrival of this wave of condensation at the closed end of the pipe coincides with the next positive pressure pulse created in the closed end of the pipe, the two reinforce one another, and an increased positive pressure peak is achieved. Under these conditions, the intermittent positive pressure pulses are synchronized with the positive pressure peaks of the traveling wave, and the phenomena of standing wave resonance is realized, with the production of the pressure and velocity anti-nodes mentioned earlier owing to interference betwen the traveling waves moving in reverse directions along the pipe as already described. The phenomena of standing wave resonance is well understood in the art of acoustics and need not be further described. Suffice it to say that it is produced in the apparatus of the invention when the positive pressure driving pulses are timed to the resonant frequency of the pipe.

Air as well as fuel may be introduced to the closed end of the pipe in order to support the intermittent combustion that excites the standing wave. The gaseous products of this combustion travel down the pipe to discharge via the said discharge orifice, and in jet propulsion forms of the invention, this "jetting" of products of combustion produces a reactive propulsive thrust on the pipe, the thrust being proportional to both mass and velocity of jetted products. A very important feature of the invention is the introduction of auxiliary air to the closed end of the pipe, i. e., air over and above that necessary to support combustion, which air is pumped the length of the pipe and jetted therefrom via the said open end, i. e., the discharge orifice, together with the products of combustion, thereby increasing mass of the discharge products, and so augmenting the thrust, as well as providing certain other advantages to be mentioned later. Thrust also results from an acoustic phenomena known as radiation pressure, as will be described presently. It is here merely to be noted that this is a feature resulting from the sonic standing wave maintained in the fluid column.

Fuel and air control valves may be employed, either mechanically operated, or operated automatically in response to cyclical pressure changes occurring in the pipe with the changing phases of the standing wave, and it is an object of the invention to provide such valves.

It is known that a symmetrical sinusoidal sound wave impinging upon a reflecting surface will exert a pressure on it, referred to in the art of sonics as radiation pressure. To understand this phenomena, consider a layer of air quite close to a reflecting surface. If it moves a given distance toward the surface, the pressure is increased, this following because of the diminished space for the quantity of gas involved in the experiment. But if it moves an equal distance away from the surface, the pressure is decreased but by a smaller amount. The decrease in pressure is of course owing to the increased space provided for the gas. The lesser pressure change in the second instance is because a lineal movement of a given distance in a direction away from the surface will cause a lesser percentage of volume change than will the same distance of lineal movement toward the surface. The result is an unsymmetrical pressure cycle reflection giving an elevated dynamic mean pressure with a net thrust against the reflecting surface. Just so, a sinusoidal pressure wave approaching the closed end portion of the aforementioned pipe will impinge against the wave reflecting end-closure of the pipe, and will exert a net thrust thereagainst. If the pipe were closed at both ends, the pressure wave traveling to the other end of the pipe would exert an equal and opposite thrust thereagainst, and the net result would be zero thrust. By the provision of a discharge opening at the other end of the pipe, a component or differential of uncancelled forward thrust remains at the reflector end thereof, and is available for propulsion. It will be evident that this uncancelled net radiation pressure thrust is over and above any thrust owing to rearward jetting of products of combustion.

I have found that the resulting thrust from radiation pressure on a given surface subjected to a continual train of sinusoidal displacement waves is quite accurately predicted by the formula:

$$T = \frac{A}{\rho}\left(\frac{p}{c}\right)^2$$

in which T is the thrust on a surface having an area A, $\rho$ being the density of the elastic medium, $p$ being the wave pressure amplitude, and $c$ being the speed of sound of the fluid under existing conditions. Although T is often considered as a small second-order value in ordinary acoustics, it becomes a very impressive and valuable factor in the high-pressure sonic wave systems of the present invention.

Substantial increase in the net thrust owing to radiation pressure is achieved according to the invention by utilizing, instead of a symmetrical wave, an asymmetrical wave in which the positive pressure pulses greatly exceed the negative pressure pulses or rarefactions. It should be clear from the discussion above that reduction of the amplitude of the negative pulses relative to the positive pulses will increase the net radiation pressure thrust against the reflecting surface.

The wave may be made asymmetrical in accordance with the invention in at least two convenient ways. First, by introducing auxiliary air to the fluid column during each negative half cycle, or period of rarefaction, the negative pressure excursions below the mean static pressure level tend to be diminished, and may be substantially eliminated. Again, the wave may be made strongly asymmetrical merely by increasing the amplitude of the positive pulses. The magnitude of the positive waves is limited only by the structural strength of the apparatus but creation of a negative pressure depression of an amplitude greater than the level of means static pressure above zero absolute pressure is impossible. Therefore, if the positive wave pulse is of a magnitude greater than twice the mean static pressure, the positive pressure peaks must exceed the negative pressure depressions, thus creating asymmetrical waves. In other words, the negative pressure pulse, or pressure "dip," cannot be greater in amplitude than the level of mean static pressure above absolute zero. On the other hand, there is no limitation on the amplitude of the positive pressure pulse, and by making it several times mean static pressure, the wave assumes a substantial asymmetrical character.

In some cases and for some purposes, the invention provides what may be termed an "enclosed system." That is to say, the open end of the pipe, or the "discharge orifice" thereof, opens or discharges in this case into an enlarged chamber, instead of directly to atmosphere. The waves arriving at the "open" end of the pipe are still expanded, however, being merely expanded into an enlarged chamber, instead of to atmosphere, and the same inverse reflection phenomena occur at the "open" end of the pipe, with establishment of a velocity anti-node thereadjacent, just as in the case in which the pipe opens to atmosphere. With such an "enclosed" system, the enlarged chamber may have a discharge orifice discharging to atmosphere, or otherwise as to be disclosed hereinafter.

The precise nature of the phenomena with use of such an enlarged chamber will be determined by the size of the chamber relative to the cross-sectional dimensions of the pipe. When the chamber is relatively small, it may have an "inductive" character, and the gas body therein will simply oscillate back and forth, in and out of the discharge orifice or nozzle leading to atmosphere, and in and out of the orifice between the pipe end and the chamber. In such a case, the velocity anti-node may actually be established at or adjacent the discharge orifice to atmosphere, and the behavior does not differ in kind from that achieved with a simple open ended quarter-wave pipe. During the half-cycle of inward flow at this orifice, surrounding outside air is sucked thereinto from virtually all directions, and flows for a distance up the pipe. During the half-cycle of outward flow, this air so taken in is jetted straight rearwardly with the products of combustion, thus augmenting the mass flow from the apparatus. This air so taken in at the velocity anti-node region of the apparatus can serve several beneficial functions, including cooling of the apparatus, supplying of necessary secondary air to complete and clean up combustion, and augmenting of the net mass flow of the jet. The oscillating gas flow, into and out of the discharge orifice, will be seen to consist of an "alternating current" gas flow, which is superimposed on the steady "direct current" flow of gases down the pipe. The direct current gases form a net flow in a rearward direction, upon which depends the jet discharge thrust. The described outside air alternately sucked into the discharge orifice from virtually all directions, and then discharged rearwardly therefrom, combines with and becomes a part of the total net flow in a rearward direction, and therefore augments the thrust. This last mentioned air will also form a net flow in a rearward direction (and therefore a jet discharge and a propulsive thrust) even in absence of a net flow of combustion or other gases flowing longitudinally through the pipe. It will further be noted that in so far as this air so alternately sucked in and expelled at the "discharge orifice" is concerned, said orifice becomes both inflow and outflow fluid passage means.

A chamber of a larger size may behave as a "capacitance" chamber. Here, the velocity anti-node approaches the region of, or is within, the open end of the pipe, adjacent its juncture with the chamber. The gas is not discharged periodically from the discharge nozzle in this case, but rather issues therefrom at relatively low pressure as a more or less constant velocity stream.

In the enclosed systems, e. g., having an enlarged or divergent section or capacitance chamber into which the sonic column empties, the pressure wave issuing from the open end of the sonic column expands to a lower pressure upon entering the larger chamber, and has its energy density reduced accordingly. Any elastic body stores energy when deformed and may be said to have a certain energy density. In static systems, the fluid has a certain energy density owing to the degree of its compression. As already explained, in standing wave systems, the energy may be in the form of potential energy at pressure anti-nodes, and kinetic energy at velocity anti-nodes, or any combination in between. At the discharge end of the sonic column of the present invention, the energy is largely in the form of kinetic energy. Within the enlarged chamber, particularly when the chamber is of relatively large size, so as to have capacitance characteristics, much of the energy will be in the form of potential energy. The pressure fluctuations in the chamber are in this case of relatively minor proportions.

As an alternating sonic wave emerges from the sonic column into the enlarged capacitance chamber, or, broadly speaking, encounters any divergence, it assumes a non-planar front, and its energy density declines with the increasing wave front since the same amount of energy is stored in a greater volume of fluid. The reduced energy density thus prevailing within the enlarged chamber provides a desirable and advantageous region for the abstraction of energy in the form of compressed fluid, since attenuation of the standing wave is thereby minimized for a given discharge rate.

The standing wave set up in the fluid column in accordance with the invention is of the utmost importance. It should be understood that a very considerable amount of energy can be stored in such a resonating fluid column, this energy, as already explained, being substantially completely in the form of periodic pressure energy at the zones of maximum pressure variation and being substantially completely in the form of periodic velocity or kinetic energy at the zones of maximum velocity variation. In the zones of maximum pressure variation, there will be substantially no to-and-fro movement of the molecules, while in the zone of maximum velocity variation, there will be a maximum to-and-fro movement of these molecules with very little pressure energy.

Among other things, the standing wave spoken of in the preceding paragraph, and the "flywheel effect" provided thereby, control and stabilize the combustion cycle of the system. Thus the intermittent positive pressure peaks at the closed end of the pipe serve to compress the fuel and air mixture prior to ignition, and thus fulfill the function of the piston of a conventional engine on the compression stroke; explosion or burning of fuel is caused to occur at or near the maximum pressure of the wave; and expansion and disposal of the products of combustion takes place during a period of decreasing pressure. Again, the intervening rarefactions at the same locality may be utilized to operate automatic intake valves. The standing wave takes the place of the flywheel of a conventional engine by providing a stabilizing force insuring the regular sequence of pressure changes which constitute the operating cycle.

The standing wave may thus be likened to "flywheel" effect. The efficiency and effectiveness of the standing wave are measured by the factor "Q," which is a figure of merit denoting flywheel effect. More technically speaking, Q is understood in arts related to wave motion to denote the ratio of energy stored to energy dissipated per half cycle. A quarter-wave length resonator (a pipe closed at one end and open at the other) inherently has a substantially higher "Q" than, for example, a half wave length resonator (a pipe open at both ends) due to its shorter length, which decreases frictional losses between the fluid and the resonator wall. Other means for increasing the factor "Q" employed by the present invention include the provision of a high mean static pressure about which the pressure alterations of the wave occur, since as the mean pressure increases, the stored energy tends to increase more rapidly than do the frictional energy losses.

One advantage of a system of high "Q" follows from the fact that the peak pressure attained at combustion increases in proportion to the compression of the fuel charge prior to ignition. When a standing wave determines this compression, as it does in the present invention, the peak pressure amplitude prior to ignition is proportional to Q. High Q therefore denotes high peak pressures, which in turn means high compression ratios, and hence high thermal efficiencies.

Another advantage of the standing wave in the quarter wave system of the present invention is that the standing wave functions to separate the high alternating pressure region at the combustion zone in the closed end of the resonant pipe from the substantially lower pressure, velocity anti-node region adjacent its discharge end, and also from the relatively low pressure conditions within the divergent chamber. The jet discharge may hence be at relatively low pressure, and therefore at relatively low jet velocity, with resultant improvement in propulsion efficiency. According to the invention in one of its aspects, an augmented mass discharge flow is provided, so as to achieve a low velocity jet, but with large mass flow, leading to high propulsion efficiency and good fuel economy. The augmented mass flow necessary to this result may be provided by pumping auxiliary air, over and above that necessary to support combustion, through the sonic fluid column. Such air may be admitted through intake valves controlled automatically by pressure depressions of the standing wave. This auxiliary air not only augments the mass flow, but also further lowers the discharge jet velocity, thus providing still further improvement at the jet. Additional advantages of the auxiliary air so admitted and pumped through the system are several in number and are mentioned elsewhere herein. It is an object of the invention to provide for the flow through the system of such auxiliary air.

I have found that sound waves aid the combustion cycle of a pulse jet engine in various further respects.

Thus, sound waves apparently have an activating effect on the combustion and definitely aid in the completeness thereof to such an extent that substantially no products of incomplete combustion are produced. It is an object of the present invention to provide a jet propulsion device employing sound waves in such manner as to facilitate the complete combustion of fuel.

I have also discovered that it is possible to operate a pistonless intermittent explosion system, employing sonic variation in pressure in the combustion zone, in such manner as to eliminate the necessity of spark ignition devices, except for starting purposes. The sonically-produced compression in the combustion chamber is sufficient to operate the system by compression ignition once the device has been set into operation. Even more remarkable is the fact that this application of sonic principles permits compression ignition not only with those fuels such as Diesel fuel, but also with a wide variety of other fuels, even those having notably poor auto-ignition characteristics. For example, commercial propane is known to have a very high octane value and a correspondingly low cetane value, making it unsuitable as a fuel in conventional Diesel engines. In the present invention, such fuel can be burned with compression ignition with complete success. It is an object of the present invention to produce an intermittent explosion jet propulsion system operable on a compression-ignition cycle.

It is an object of the present invention to apply sonic principles to aid in the efficient burning of fuel in a jet propulsion system.

Air or air-fuel mixtures are preferably supplied to the combustion zone through a pipe of a length correlated with the length of the fluid column. By using an intake pipe of appropriate length, the fluid flowing through this pipe can be made to resonate in a manner aiding in the operation of the device. It is an object of the present invention to provide such a system and, in one embodiment of the invention, to provide a forwardly-facing scoop disposed in the air stream of the aircraft or other vehicle in such manner that forward motion of the device aids in building up the mean pressure within the device or in introducing or "ramming" air into the aforementioned resonant intake pipe or an air-fuel mixture into the combustion chamber. It is also an object of the invention to provide a suitable pumping means, if desired, for forcing air or air-fuel mixture into the combustion chamber.

Among the objects of the invention are the provision of combustion means for the creation of a sonic standing wave in a fluid column to obtain a thrust and/or a pumping of the fluid medium. In this connection, other objects of the invention lie in the novel relationship between the sonic column and the combustion space, and it is an object of the invention to arrange the sonic column to facilitate cyclic action in the combustion space, such as intake, exhaust, ignition, scavenging, etc.

These and additional objects and features of the invention will be apparent to those skilled in the art from a consideration of the following description of certain illustrative embodiments of the invention, reference being had to the accompanying drawings, in which:

Figure 1 is a diagrammatic view in vertical longitudinal section of one embodiment of the invention;

Figure 2 is an enlarged detail of a portion of Figure 1, the air intake pump being omitted;

Figure 2a is an enlarged detail showing a modification of a portion of Figure 1;

Figure 3 is a vertical sectional view of a modified form of combustion chamber;

Figure 4 is a diagrammatic elevational view of the invention, while Figures 4a and 4b represent wave patterns representative of the sonic variations in pressure and velocity in different parts of the system at the fundamental and first overtone frequencies;

Figure 7 is a longitudinal sectional view of another embodiment of the invention;

Figure 8 is a longitudinal sectional view of another embodiment of the invention;

Figure 15 is a fragmentary sectional view of the head end of a resonant pipe employing mechanical means for exciting resonance;

Figure 16 is a longitudinal sectional view of a modified embodiment of the invention wherein means is provided which excites resonance at a pressure anti-node located between two velocity anti-nodes;

Figure 5:
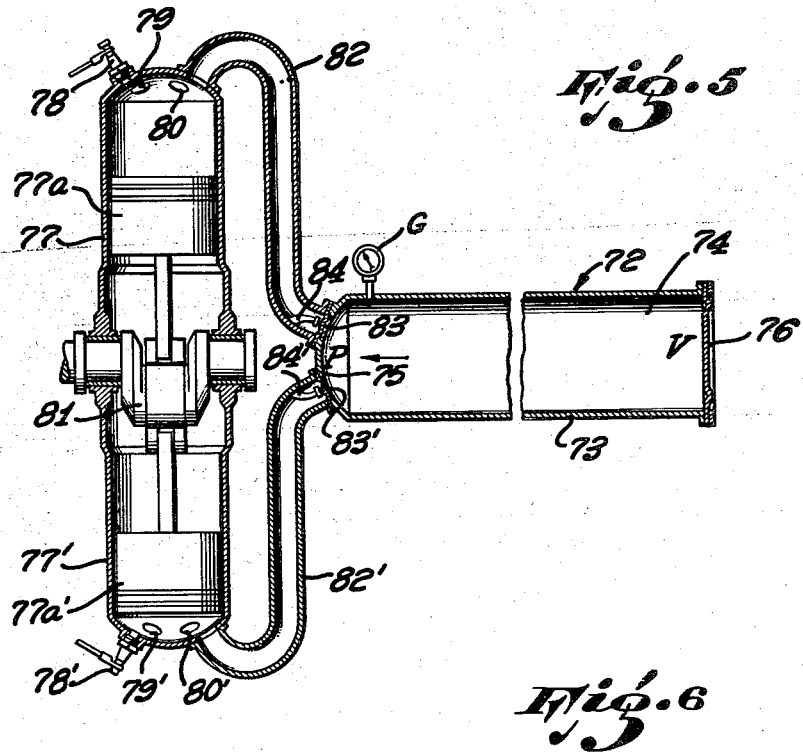
Figure 5 is a longitudinal sectional view of another embodiment of the invention.

Figure 17 is an elevational view of a modified embodiment of the invention embodying a bottle-shaped, substantially quarter-wave length resonant pipe in accordance with the invention; and Figure 18 is a longitudinal sectional view of still another modified embodiment of the invention, employing a resonant pipe which is divergent, or in the form of a spherical sector, for a substantial proportion of its length.

With reference first to the embodiment of the invention disclosed in Figures 1 and 2 of the drawings, the invention employs a housing embodying sonic pipe or tube 10 of substantial length as compared with its cross-sectional direction and containing a column of fluid 11 which is resonated to establish a standing wave therein in a manner presently to appear. If the sonic pipe 10 were substantially closed at both ends, the lowest frequency at which it would resonate would be identified with a wave length which is twice the length of the pipe. This would be true, also, if the sonic pipe 10 were open at both ends. However, by having the pipe 10 closed at one end and sonically open at the other, its lowest major resonance frequency will be that of a quarter-wave pipe, which means that the corresponding fundamental wave length will be four times its length.

As best shown in Figure 2, the left hand or closed end of pipe 10 is laterally enlarged by wall 12 extending from one side of the pipe to provide an offset combustion chamber 13 and to provide angularly disposed flanges 14 and 15. The opening of these flanges are closed respectively, by end walls 16 and 17.

The end wall 16 is suitably bolted to the flange 14, and attached thereto is an intake pipe section 18, with which another intake pipe section 19 adjustably telescopes to provide an air intake passage 20 which can be adjusted in length by movement of the intake pipe section 19. The forward portion of the intake pipe section 19 preferably faces the air stream of the aircraft or other vehicle with which the device is used, this forward end being preferably flared to provide an air scoop 21 aiding the movement of air along the passage 20 into the sonic pipe 10.

A suitable intermittently-operated valve means 22 is disposed between the air intake passage 20 and the column of fluid 11. A light-weight poppet valve is very satisfactory for this purpose, the valve shown in Figure 2 including a tapered head 23 normally engaging a beveled seat in the end wall 16. A valve stem 25 is slidably journalled in a boss 26 and is threaded at its outer end to receive a nut 27 bearing against a plate 28. A light compression spring 30 is compressed between the boss 26 and the plate 28 to bias the valve toward closed position, and the degree of bias being adjustable by turning the nut 27.

Similarly, the end wall 17 is suitably bolted to the flange 15 and carries telescoping intake pipe sections 32 and 33 defining another air intake passage 34. The forward end of the section 33 may provide a flange 35, as shown in Figure 1, or may be flared as indicated in Figure 2, to form a forwardly-facing air scoop 36 facilitating flow of air along the air intake passage 34 to the combustion chamber 13. A suitable valve means 37 is disposed in this path of flow, and, as in the valve means 22, may include a poppet valve including a head 38 engaging a beveled seat in the end wall 17 and carrying a stem 39 slidably journalled in a boss 40 and receiving a nut 41 for adjustment of the biasing action exerted by a light compression spring 42.

Either or both of the air intake passages 20 and 34 may be utilized for delivering fuel to the combustion chamber 13, or this fuel may be otherwise delivered to the combustion zone in properly timed relationship. A system which I have found particularly advantageous is illustrated in Figures 1 and 2 in which the air intake passage 20 delivers exclusively a stream of air or other fluid to the sonic pipe 10, while an air-fuel mixture is delivered to the combustion chamber 13 by the air intake passage 34, which may be made smaller in cross-sectional area than the air intake passage 20. The fuel may be mixed with the air by any suitable carburetion device and, preferably, the amount of fuel varies with the amount of air entering the combustion zone. In Figures 1 and 2, any suitable liquid or gaseous fuel is jetted into the auxiliary air intake passage 34 by means of a spray nozzle 43 to which the fuel is delivered under pressure from a variable-delivery fuel pump 44 which may be of the intermittent or constant-delivery type. This fuel pump is shown as being driven by an adjustable speed motor 45, the mechanical interconnection being suggested by the dotted line 46. The fuel mixes intimately with the air stream and the air-fuel mixture is delivered to the combustion chamber 13 when the valve means 37 is open.

To initiate operation of the device, a spark ignition system is desirable. Figures 1 and 2 show a conventional spark plug 47 extending into the combustion chamber 13 through the wall 12. This spark plug may be energized by any suitable means, the embodiment shown including a conventional induction coil 48 having a high voltage secondary winding 49 grounded at one end and connected to the insulated electrode of the spark plug 47 at the other end. This induction coil includes a primary winding 50, one terminal of which is grounded and the other terminal of which is energized through a make-and-break switch 51 operated by a cam 52 mechanically connected to the motor 45, as suggested by the dotted line 53. The usual condenser 54 is connected around the contacts of the make-and-break switch 51 and an ignition switch 55 serves, when closed, to connect a battery 56 in circuit with the primary winding 50 when the make-and-break switch 51 is closed. When the cam 52 opens the make-and-break switch 51, a high voltage is induced in the secondary winding 49 to produce a spark in the combustion chamber.

Starting may be facilitated by using an air pump 57 or blower which may be connected to force air through the auxiliary air intake passage 34, the fuel being delivered to this air stream, the air-fuel mixture being delivered to the valve means 37 under superatmospheric pressure, preferably a pressure sufficient to open this valve means and force a charge of the air-fuel mixture into the combustion chamber 13. This pump 57 may be of any suitable type but I prefer to employ a pump of the timed-discharge type. As shown, this pump is of the vane type, providing a hub 58 mechanically connected to the motor 45, as suggested by dotted line 59, this hub rotating off-center with respect to the housing 60. Vanes 61 slide in radial slots of the hub 58 and are urged resiliently outward into contact with the inner periphery of the housing 70 by suitable spring means, all as well known in this type of pump. Air is delivered to the housing 60 through a pipe 62. Such a pump will produce a pulsating discharge so that it is desirable to operate the pump in timed relation with the combustion cycle, this being accomplished by the connection 59. This pump 57 may be used to facilitate starting. Once the device has begun to resonate with a standing wave of sufficient amplitude, pump 57 may be disconnected at flange 35 and air will thereafter be inducted into the column 11 by the periodic occurrence of a rarefaction in the closed end of pipe 10. If desired, however, pump 57 can be maintained continuously in operation to exert a supercharging action on the air-fuel mixture and aid in maintaining a high mean pressure in the system. In the latter event, the forward end of the pipe 62 may be flared to form an air scoop 63 facing the air stream. In the absence of the pump 57, the device may be started by introducing an increment of fuel into the combustion chamber by any suitable means and the air scoop 36 of Figure 2 may be employed to increase the pressure of the incoming air as a result of forward velocity or tuning of the connected intake pipe, or both.

At the rear or right hand end of the sonic pipe 10 is preferably provided a divergent chamber formed by a bulbous enlargement or casing 65, this enlargement, depending upon its size, forming a chamber C having capacitance characteristics. The capacitance chamber should be substantially larger in cross-sectional area than the sonic pipe 10, and may be roughly in the proportions shown in Figure 1. A rearwardly directed nozzle 66, preferably though not necessarily axially alined with pipe 10, communicates with the capacitance chamber C and delivers a jet of products of combustion and air into the atmosphere in the direction indicated by the arrow. Any suitably shaped nozzle or discharge orifice suited to jet propulsion can be employed, a rearwardly-diverging nozzle being here shown, and being usually preferred. The forward thrust resulting from the apparatus is of course in a direction opposite from that of the direction of jet discharge.

The sonic principles on which the device operates can best be explained in an elementary way by considering, first, that the sonic pipe 10 is open to the atmosphere at section A—A, similar to an open-ended quarter-wave organ pipe, so that the mean static pressure in the pipe is atmospheric. In fact, in simple forms of the invention, the pipe 10 may actually open or discharge to atmosphere substantially at section A—A, the open end portion of the pipe 10 forming the jet discharge nozzle or orifice. Assume also that a very small charge of a combustible air-fuel mixture is placed in the combustion chamber 13 adjacent spark plug 47, and that the valve 22 is permanently locked in closed position.

If this charge of fuel is ignited by a spark, at a time which may be termed "time 0," a miniature explosion will result to increase the pressure in the zone P adjacent the combustion chamber 13.

Disregarding, first, any flow of air or products of combustion along and from the sonic pipe, and considering only the wave motion in the system, it will be clear that the miniature explosion will increase the pressure in zone P, i. e., will create a positive pressure pulse therein, and will launch a positive pressure wave or wave of condensation along the column of fluid 11. This positive pressure wave, traveling at the speed of sound in the fluid column 11, will reach the open end A—A of the sonic pipe 10 at a slightly later time, termed "time 1," and will experience inverse reflection at said open end. That is to say, the open end of the pipe reflects the positive pressure wave as a wave of reverse kind, namely, a negative pressure wave or wave of rarefaction, which will travel back up the pipe. When, at "time 2," this wave of rarefaction reaches zone P, the pressure therein will be below the original, atmospheric pressure by an amount slightly less than the positive pressure pulse developed by the explosion, this pressure depression following from the elastic nature of the fluid. The returning wave of rarefaction then reinforces the pressure depression thus produced at "time 2" by the initial explosion. The wave of rarefaction, having reached zone P, will experience like-kind reflection by the end walls closing the zone P, and the reflected wave of rarefaction is thus launched along column 11 toward the open end of the pipe. Reaching open section A—A at "time 3," this wave of rarefaction is reflected by inverse reflection as a wave of condensation traveling back up the gas column to reach zone P at "time 4." This condensation wave is reflected as a new wave of condensation traveling again toward the open end of the pipe. If, at such "time 4," when the wave of condensation reaches zone P, another explosion is created, the pressure then at zone P will be reinforced and a condition of resonance will be established in the column of fluid 11, with a zone of maximum or large pressure variation, i. e., a pressure anti-node, at P, and a zone of maximum or substantial velocity variation, i. e., a velocity anti-node, at V adjacent open end A—A.

An increment of air-fuel mixture will be drawn into the combustion chamber 13 through valve 37 each time the pressure in this combustion zone is lower than the pressure in the intake passage 34 by an amount sufficient to overcome the action of the spring 42. Correspondingly, at "time 2" when the pressure in zone P is reduced by the presence of the rarefaction wave, an additional increment of air-fuel mixture is delivered to the combustion zone. This additional charge is compressed between "time 2" and "time 4," simulating the compression stroke of an internal combustion engine, so that the subsequent spark at "time 4" will produce the reinforcing positive pressure pulse mentioned above.

A phenomena observed in the operation of such an apparatus is that on each half-cycle of the standing wave during which the direction of fluid velocity at V is up or into the pipe 10, outside air is sucked into the open end of the pipe from virtually all directions. On the other half cycle, this air is forcibly expelled from the open end of the pipe in a straight rearward direction along with products of combustion, thus adding to the mass flow of the jet, and so increasing the propulsive thrust. This outside air thus pumped through a portion of the system has several beneficial effects, as mentioned elsewhere herein.

It should be clearly understood that such a combustion cycle is not dependent upon a mass or "plug" of gas moving to and fro between the combustion chamber and the assumed-open end at section A—A. Any such mass movement of air is of a velocity quite unrelated to the rate of wave transmission. In other words, the wave phenomena indicated as occurring at times 1, 2, 3 and 4 will all take place independently of any bodily movement of fluid from the combustion chamber to and from the assumed-open end at section A—A. It is important to understand that the present invention thus differs from previously proposed surge systems in which, in effect, a "plug" of fluid traverses the entire length of the pipe after each explosion, the inertia of this "plug" reducing the pressure sufficiently to draw a new combustible charge into the combustion zone, the pipe being wholly or partially closed at the far end with only a small discharge of fluid therefrom to leave a residual compressed mass, which again largely re-traverses the pipe to the combustion chamber to compress the new combustible charge. Such surge systems usually operate on much lower frequencies than the sonic system of the present invention and do not employ sonic principles.

Considering, next, that the capacitance chamber C is employed, as shown in Figure 1, this does not substantially change the conditions previously described with reference to the pipe being open at section A—A. In other words, the capacitance chamber C allows the fluid column 11 and pipe 10 to resonate as if the zone V were open to the atmosphere or to a relatively large space. The zone V still remains a zone in which the energy is primarily kinetic and in which the pressure variations are small or negligible as compared to the pressure variations in zone P. The chamber C does, however, have several additional very important functions, varying considerably with its size relative to that of the pipe 10. In the first place, and assuming that the chamber is large enough to function as a capacitance chamber, the velocity variations occurring at zone V are smoothed out and any turbulence in the forward end of the capacitance chamber tends to be eliminated before discharge of fluid through the nozzle 66, thus insuring a more uniform and constant flow from the nozzle to produce the propulsive jet. In the second place, the capacitance chamber permits employing a restricted nozzle 66 to build up and maintain a back pressure on the pipe 10, which elevates the mean pressure in the pipe 10, thereby accomplishing a corresponding increase in the value of Q, and aiding in the thermodynamics of the cycle as already explained. Further, the capacitance chamber C directs gases at substantially constant pressure to the nozzle 66 and the high mean pressure in the capacitance chamber increases the pressure head available to form the propulsive jet. At the same time, the capacitance chamber tends to iron out minor pressure variations, with the result that the jet issuing from the nozzle may be of substantially constant velocity.

On the other hand, with a chamber C of small size relative to the closed section of the pipe 10, the behaviour may be more nearly that of the apparatus considered as terminated at the section A—A. In such a case, the velocity anti-node V is displaced to the region of the discharge nozzle, and outside air is drawn into the nozzle during alternate half cycles from virtually all directions, to be expelled with the products of combustion in a straight rearward direction during the remaining half cycles, as already explained.

Considering now the action of the system when the intake valve 22 is permitted to operate, it will be clearly seen that a stream of auxiliary air may enter zone P in timed relationship with the entry of air-fuel mixture past valve 37. By proper adjustment of the springs 30 and 42, a stream of air and a stream of air-fuel mixture may simultaneously enter zone P, though this simultaneous entry is not essential to the invention, as will be later described. The stream of air entering through the valve 22 tends to move directly into the sonic pipe 10, while the stream of air-fuel mixture entering through the valve 37 is directed more immediately to the laterally offset combustion chamber 13. If desired, this air fuel mixture may be excessively rich as it is introduced through the valve means 37 and some of the air entering through the valve means 22 may bring this mixture into a leaner condition. On the other hand, it is distinctly desirable that most of the air entering from the main air intake passage 20 be conducted directly to the sonic pipe 10, and this air should not scavenge from the combustion chamber 13 the fuel entering therein.

It will be noted that the valve means 22 is of greater capacity than the valve means 37, and this is often desirable in increasing the amount of air entering the pipe 10. This result can be accomplished by making a single valve means 22 larger than the valve means 37, or by using a plurality of valves for the valve means 22, such for instance as a plurality of reed valves 22a as indicated in Figure 2a. In either instance, the air intake passage 20 may be correlated in size, to the end that the amount of air entering the system through the passage 20 may be substantially larger than the amount of air or air-fuel mixture entering through the passage 34. Correspondingly, the appearance of a rarefaction at zone P can draw a relatively large amount of air from the passage 20 directly into the sonic pipe 10, and this mass of air may advance a substantial distance along this pipe before the air-fuel mixture, introduced through the valve 37, is exploded. The steady discharge at mean pressure from the nozzle 66 thus accelerates both the products of combustion and the mass of air drawn into the pipe 10 through the passage 20. In this respect, the invention acts as an air pump and this is very advantageous in jet propulsion systems as the mass of air in the jet can be greatly increased over conventional systems, with attendant increase in propulsive thrust. It should be understood, however, that the air thus taken in is not jetted from the nozzle 66 directly by the explosions, nor is the air pumped in by inertia surges from the jet. Actually (assuming a large capacitance chamber), the air is introduced into the compressed gas reservoir by sonics and discharged therefrom in a steady stream at mean pressure. While a supplementary air supply is very desirable to the invention, the resulting added thrust, if not desired or needed, can be eliminated by rendering the valve means 22 completely inoperative. Results far better than those produced by conventional systems can still be obtained by the discharge merely of the products of combustion.

The combined fluid-conducting areas of the valve means 22 and 37 should preferably be substantially larger than the cross-sectional area of the passage provided by the nozzle 66. This is one way of establishing high mean pressures in the device, with the distinct advantages noted above. Such relatively large intake valves permit the device to "swallow" a large volume of air or air-fuel mixture when the pressure in zone P is sufficiently below the mean pressure. The nozzle 66, being of substantially more restricted area, does not permit discharge of an equal amount of the air or combustion products following the first explosion, with the result that the mean pressure in the system quickly builds up during the first few explosions to a high equilibrium value limited by the damping effect of the to and fro oscillation adjacent zone V.

A propulsive thrust is also obtained as a result of the radiation pressure phenomena discussed hereinbefore. Thus, radiation pressure at the pressure anti-node region P exerts a propulsive thrust on the closed wave-reflecting end areas at the front or left hand end of pipe 10. To the extent that there exists closed end wall area at the opposite or jet end of the apparatus, this radiation pressure thrust may be cancelled out by an equally and opposing radiation pressure thrust in the opposite direction. But the orifice area of the nozzle 66 does not have a cancelling effect on the projected front end wall area directly opposite thereto, and radiation pressure against this end wall area therefore provides a radiation pressure thrust which is derived from sonic wave energy exclusively, and which is not dependent upon net mass discharge from the nozzle.

With relatively high mean pressures, the amplitude of the pressure variation in zone P can be made very large as can also the mass of fluid (air and combustion products) issuing from nozzle 66. The pressure depression below static pressure may however be greatly reduced or substantially cancelled by the intake of air and air-fuel mixture from pipes 20 and 34. Accordingly, the wave pattern in the device will usually not be symmetrical, and the positive pulses will greatly exceed in amplitude the negative pulses. Such asymmetrical wave patterns increase the radiation pressure thrust of the device in a manner explained hereinabove.

The employment of multiple intake valves is very desirable, irrespective of whether some of these valves deliver exclusively air while others deliver an air-fuel mixture. This is particularly true if the valves are actuated by a difference in pressure on opposite sides thereof. In some instances, it is desirable to operate the invention at relatively high frequencies and the use of a plurality of smaller intake valves, as compared with a single large intake valve, permits light-weight design with consequent freedom of movement in step with the frequencies. A plurality of intake valves also provides a large total valve area, resulting in high volumetric efficiencies. Further, it is often possible to design a plurality of intake valves to provide better reflecting surfaces than would be present if a single intake valve were employed. In addition, a plurality of intake valves permits distribution of the incoming air and avoids a concentrated intake mass-flow with inertia effects, which in some instances are undesirable.

Further, the employment of multiple intake valves permits a design in which the valves may open successively as the amplitude of the wave pattern increases. In other words, for part-load operation, less than all of the valves can be made to operate whereas, at full load, the entire group can be brought into operation.

Even further, employment of multiple intake valves permits opening thereof at different times in the combustion cycle. By way of example, the spring tension on the valve means 31 may be set to permit this valve means to open before the valve means 22, the latter opening closer to the peaks of the rarefaction wave. This mode of operation is entirely successful, and, in some instances, a reverse sequence is desirable, namely, opening of the valve means 22 ahead of the valve means 37 so that the fuel is introduced in a shorter portion of the cycle than corresponds to the time the valve means 22 is opened. The former system is particularly desirable in a device subject to wide variation in output thrust, while the latter system is often desirable when the device is used under more constant conditions.

Regardless of whether or not multiple intake valves are used, the design thereof is preferably related to the frequency at which the system is to operate. Each valve and its associated spring has a natural period of vibration, and it is desirable that this natural period be made to correspond to (usually somewhat exceed) the frequency developed by the system. This can be done by proper design of the spring and movable valve member. The spring design is usually more important.

It should be understood that the frequency at which the system operates can be a fundamental frequency, corresponding to a wave length four times the distance between zones P and V, or at some overtone frequency, in accordance with the equation:

$$n = \frac{S(2N-1)}{4 \times L}$$

where $n$ is the frequency in cycles per second; $S$ is the speed of sound in the fluid of the column, in feet per second; $L$ is the length of the pipe, in feet, between zones P and V; and $N$ is any whole number. At $N=1$, the fundamental frequency will be determined. At $N=2$ and $N=3$ the first and second overtones will be determined, which, from the equation, will be seen to be 3 and 5 times the fundamental frequency, respectively. Such frequency relationships and their applicability to the invention are suggested in Figures 4a and 4b, based on sinusoidal or symmetrical wave patterns. Thus, in Figure 4a, the fundamental frequency is shown, the envelope between full-line curves 67 and 67a indicating pressure variations at various positions along the pipe 10, while the envelope between dotted-line curves 68 and 68a indicates velocity variations at the various positions. Similarly, the full lines 69 and 69a of Figure 4b represent pressure variations of the first overtone or harmonic frequency, while the dotted lines 70 and 70a represent velocity variations under such conditions.

Even when operating at the fundamental frequency, there will usually be present certain overtone frequencies which I believe to be advantageous in aiding combustion, as will be later mentioned. If it is desired that the main operating frequency be one of the overtone frequencies, such operation can be established either by proper design or adjustment of the spring action on the valves, or by adjustment of the length of the intake passage 20 or 34, or both. Even when operating at overtone frequencies, the zone P remains a zone of maximum pressure variation, while the zone V represents a zone of substantial velocity variation and very little pressure variation. In this instance, however, there will be one or more other zones of substantial velocity variation between zones P and V, indicated in Figure 1.

It is desirable that the air intake passages 20 and 34 be adjustable in length, both for reasons noted above and because the columns of air in these passages can themselves be resonated if of proper length. Such resonant conditions in the air intake passages can be made to give rise to standing waves therein, aiding in the delivery of air to the interior of the device. Such standing waves can be established in the air intake passage 20 by reason of the fluctuations in flow through the valve means 22. Further, the mean pressure level, and the amplitude of the standing wave are heightened by the "ramming" effect of the scoop 21 during forward motion of the device. The same is true regarding the air intake passage 34, but, in addition, if the pump 57 is used, the resonance may be established in part by the pulsating discharge of this pump. On the other hand, the invention does not depend for operativeness upon the tuning of such air intake passages and, if desired, these passages can be extremely short to avoid any substantial resonance therein.

The system shown in Figure 1 can be set into operation merely by starting the motor 45, which drives, in properly timed relationship, the air pump 57, the fuel pump 44, and the make-and-break switch 51 of the ignition system. The device usually starts instantaneously upon ignition of the first fuel increment. In fact, after the first few explosions, the ignition switch 55 can be opened to deenergize the ignition system and the device will continue to operate on a compression-ignition cycle because of the high mean pressures, with attendant large swings in pressure in the zone P to perform the compression and fuel intake functions. After the device is in operation, I prefer to continue use of the air pump 57 to aid in maintaning a higher mean pressure, but this is not in all instances necessary, in which event the pump 57 can be disconnected. If an appropriate carburetor is used for metering the fuel into the passage 34, instead of or supplementary to the action of the fuel pump 46, no pressure supply of fuel need be employed to continue the device in operation. In this event, the only moving mechanical element of the system is the intake valve means. The power output of the device can easily be controlled by varying the fuel input.

My system involves the use of wave motion and wave energy, as distinct from a mode of operation employing large mass surges. It employs principles of sonics and the changes in pressure and velocity relationships are, in some respect, similar to those in organ pipes or other sonic pipes with unlike ends. Mean-pressure discharge from the capacitance chamber will advance products of combustion rearwardly along the sonic pipe 10, but such net rearward movement of the gases along the column 11 does not destroy nor substantially interfere with the wave motion or sound waves characterizing the invention. Toward the zone V, the gas molecules will oscillate forwardly and rearwardly with increasing amplitude due to the approach to a zone of substantial velocity variation, but this motion will be superimposed on the net rearward motion of the gases.

It is not essential to the invention that extremely high temperatures be maintained in the walls of the combustion chamber 13, nor to provide "hot spot" ignition. In fact, it is often desirable to jacket the combustion chamber 13, as suggested at 71 in Figure 3, and the complete combustion continues even though the walls of this chamber are maintained relatively cool.

The invention, when operating on a compression-ignition cycle, has been found very satisfactory even on fuels having notably poor auto-ignition characteristics. The invention has been operated with conventional Diesel fuel, relatively heavy fuel oil, kerosene, gasoline, and even with commercial butane and commercial propane. It is believed that the excellent combustion characteristics of the device are attributable not only to sonically-induced pressure variations but also to sonically-induced activation of the combustion flame. My tests seem to indicate that the fundamental frequency alone, or combined with overtones, is useful in aiding combustion.

From the above, it will be apparent that the invention comprehends a new system for jet propulsion applicable to airplanes or other vehicles in which mass acceleration is obtained by sonic means and in which the phenomena of radiation contributes additionally to the thrust. It includes, also, the concept of accelerating masses of air or other fluid in addition to the products of combustion. Most commonly, the device is constructed with the sonic pipe 10 in axial alignment with the rearwardly-directed nozzle 66, but it should be clear that the invention is not limited thereto. By the term rearwardly-directed nozzle or jet, I have reference to a nozzle or jet directed rearwardly with respect to the line of desired instantaneous thrust, irrespective of whether the nozzle 66 and the sonic pipe 10 are in axial alignment. Further, by the term "pipe" as herein used, I do not intend a limitation to circular cross-section nor to necessarily uniform cross-sections along its length. Further, a straight pipe or conduit is not necessarily implied. Rather, I employ the word "pipe" as a conduit means providing a passage, curved or straight, with or without divergences or restrictions, confining fluid as an elongated column, irrespective of whether the cross-sectional areas are uniform or circular.

The modified embodiment of the invention disclosed in Figure 5 employs a separate internal combustion engine for generating the pressure pulses which drive the resonant gas column, and it is further characterized by a flexible diaphragm used at the velocity anti-node end of the resonant pipe. A sonic column means or housing 72 comprises a pipe 73 forming a wave conduit and containing a fluid column 74 (liquid or gas), a head 75 at the closed end of the system, and a flexible diaphragm 76 at the far end of the system. The far side of the diaphragm 76 is open to the atmosphere.

An internal combustion engine for generating the sonic waves in the fluid column is somewhat diagrammatically shown as employing opposed cylinders 77 and 77' equipped with pistons 77a and 77a', conventional ignition means 78 and 78', conventional intake valve means 79 and 79', and conventional exhaust means 80 and 80'. The pistons 77a and 77a' operate 180° out of phase by conventional connection to a crank shaft 81 which, if desired, can be employed to drive conventional traction means, for example, wheels, an aircraft propeller, etc.

Extending from the cylinder 77 is a pipe 82 providing a passage openly communicating with the combustion space of cylinder 77. A flexible diaphragm 83 separates the interior of this passage 82 from the fluid column 74 and a diaphragm stop 84 may be employed to prevent excessive deflection of the diaphragm 83 under the influence of a high pressure in the column and a low pressure in the pipe 82. A similar pipe and diaphragm means is shown extending between the cylinder 77' and the sonic column, the elements being represented by corresponding primed numerals. The combustion excited system is shown only diagrammatically for the purpose of clarity and, in practice, the passages will be made to communicate with their respective combustion spaces at a position so as not to interfere with valves, spark plugs, injectors, etc., and to be made considerably shorter than indicated in Figure 5. In effect, these passages comprise a part of the compression space of the engine.

The operation of this form of the embodiment is as follows: with the internal combustion engine operating in a substantially normal manner, the separate explosive positive pressure pulses occurring, for example, in the cylinder 77, are transmitted in part to the piston 77a and in part to the diaphragm 83. Each explosion in the cylinder 77 thus creates a positive pressure pulse in the fluid column 74 and this sequence of pulses, supplied to the head end zone P of the sonic column, will establish a standing wave pattern in the fluid column 74, being transmitted to the flexible diaphragm 76 and being reflected from the diaphragm by the process of inverse reflection in a manner very similar to that at an open end.

As each separate pressure pulse occurs in the fluid column 74 in the zone P near the reflector head 75, it generates a momentary pressure against said head in the direction of the arrow in the figure, as well as upon the side wall of the pipe 73 in the head end region. Since each unit of area of this side wall is opposed by a diametrically opposite unit of area, there is no resulting side thrust as a result of the pressure pulse. However, an endwise resulting thrust in the direction of the arrow may be generated by each pulse against the reflecting head 75 and the diaphragms 83, 83' because the pulse energy must be transmitted to and applied to an opposing surface at the far extremity of the pipe 73 in order to generate an opposing thrust. Prevention of such an opposing thrust in the zone V adjacent the diaphragm 76 is accomplished by having the far side of the flexible diaphragm exposed to the atmosphere, whereby the diaphragm is enabled to deflect rearwardly and so transmit the thrust to the atmosphere rather than to pipe 73.

The system of Figure 5 can produce a thrust irrespective of resonance in the sonic column but the magnitude of the thrust is much increased if suitable resonance conditions are established. Establishment of such resonance requires the correlation between the length of the column (between the head 75 and the diaphragm 76) and the time rate of explosions in the internal combustion chamber, keeping in mind the velocity of sound in the medium of the column. Calculation of different frequencies (fundamental and harmonic) by which the column will resonate can be made by employment of the conventional formulae applicable to organ pipes open at one end, the zone P corresponding to the closed pressure anti-node end of the pipe and the zone V corresponding to the open velocity anti-node thereof. Resonance at the desired fundamental or harmonic frequency can best be established by adjusting the frequency of the explosion pulses in the internal combustion engine, and a condition of resonance can be easily noted by a maximum obtainment of thrust or by reading an ordinary pressure gage G responsive to the pressures in the column 74 and adjusting the speed of the internal combustion engine to maximum reading of this gage. It will be understood that the sonic column 74 may be employed on a single cylinder, or one may be arranged for each cylinder of the engine, or two or more cylinders may be connected to the same sonic column as suggested in Figure 5. If more than one cylinder is connected to the sonic column, the pressure pulses should preferably be cyclically arranged, e. g., pulses delivered to the column 74 should desirably be equally time-spaced, and, of course, it is desirable that the frequency be such as to resonate the column 74 as noted above.

Figure 6:
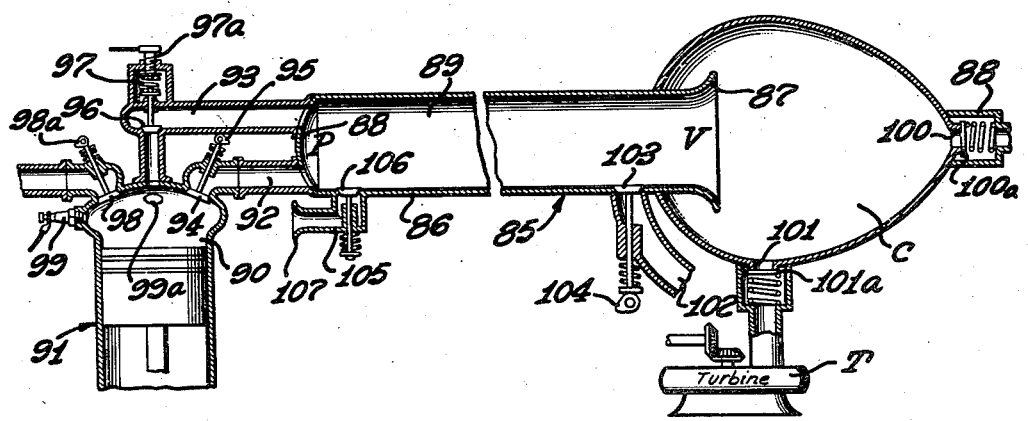
Figure 6 is a longitudinal sectional view of still another embodiment of the invention.

In Figure 6 is shown an exemplification of what I refer to as an "enclosed system," namely, one in which the resonant pipe proper has its open end discharging into an enlarged divergent housing, or capacitance chamber. This system of Figure 6 may be used for propulsion, or by mounting the system on a stationary foundation, it may become a blower or compressor, useful for many purposes, and shown in this instance as driving a gas turbine, whose power may be utilized in any way desired. The turbine might, for instance, be used to drive a conventional supercharger (not illustrated) which furnishes the explosive mixture to the combustion chamber.

Numeral 85 in Figure 6 designates the housing of the enclosed sonic system in its entirety, made up of resonant pipe 86 whose flared open end 87 discharges gases into the enlarged or divergent chamber C, the open end 87 functioning as a sonic wave expander as will appear. The pipe 86, which has a closed end or head 88 adapted to function as a wave reflector, comprises a sonic wave conduit defining a sonic fluid column 89 in which a standing wave is developed having pressure anti-node P adjacent head 88 and velocity anti-node V at open end 87. The opening of the pipe 86 into the divergent chamber C provides a substantial degree of wave divergence, accompanied by a corresponding degree of energy density reduction. The capacitance chamber permits velocity variations at V without great change in capacitance chamber pressure. The instant embodiment is but one exemplification of the invention's use of a housing providing a degree of wave divergence. Modifications later to be discussed will indicate how the divergence may occur throughout greater lengths of the wave path.

The apparatus is driven by means of pressure pulses from a combustion chamber 90 of an internal combustion engine 91, which pulses are applied directly to the fluid column 89 by two conduits capable of being used alternately or together. The first comprises an exhaust passage 92 conducting the exhaust gases from the combustion chamber 90 to the head end of the fluid column 89, and the second comprises an auxiliary exhaust passage 93 conducting a portion of the exhaust gases to the head end of the fluid column. The flow of exhaust gases through the former is controlled by a conventional exhaust valve 94 operated by an engine timed cam 95, and the latter includes an adjustable spring-loaded valve 96 including a spring 97, the compression of which is adjustable by turning a screw 97a, this screw being of such length as to maximize the valve stroke and conduct heat from the valve stem while in contact therewith. Admission of fuel-air mixture to the combustion chamber 90 is by way of a conventional intake valve 98 operated by a cam 98a, the fuel being ignited by a spark plug 99, though it will be clear that this intake and explosion system will be modified in the case of Diesel or injection-type engines to follow known practice.

Capacitance chamber C is provided with discharge orifices 100 and 101, preferably provided with spring-loaded check valves 100a and 101a, respectively, here shown as discharging combustion products rearward and sideward, respectively, from the capacitance chamber C. Either or both of these valves may be employed, and either or both may be equipped with auxiliary means such as turbine T driven by the exhaust gases and used for such auxiliary functions as driving the engine supercharger, etc. For jet propulsion purposes, the rearward discharge orifice 100 is preferably employed, and a jet discharge of products of combustion issues therefrom to the atmosphere. The spring-loaded valves 100a and 101a serve to hold a back pressure on the system, producing an elevated mean static pressure, and correspondingly high Q, with attendant advantages already discussed.

Augmentation of wave expansion near the zone V of the fluid column can be achieved by means of the exhaust passage 102 connected into tubing 86 near region V, and controlled by poppet valve 103 operated by cam 104. The timing of valve 103 may be such that this valve opens at a time when pressure thereadjacent tends to build up under the influence of the pressure pulse transmitted from the zone P through the fluid column. While the zone V is a zone of maximum velocity variation, there will usually be some pressure variations in this zone, or at least at the adjacent zone where the valve 103 is located. Alternatively, the passage 102 may be utilized to introduce auxiliary air to the zone V during the half cycle of fluid velocity in the direction from V toward P.

A particular feature by which asymmetry of the wave pattern can be achieved, in this instance near zone P, comprises an intake air passage 105 opening to pipe 86 near zone P, and controlled by spring-loaded intake valve 106. Passage 105 may advantageously be provided with a forwardly facing scoop 107 adapted to pick up air during forward velocity of the apparatus and to supply such air at a somewhat elevated ram pressure. Valve 106 opens automatically in response to a predetermined differential between the ram pressure in the passage 105 and negative pressure existing at P on alternate half cycles. Auxiliary air if thus introduced on negative half cycles of the standing wave in column 89, can serve the purpose of negative wave destruction, giving an asymmetrical wave pattern. The auxiliary air thus introduced is also useful in other respects, including that of increasing the mass flow of fluids through the system. I have also found that the intake of air through the forwardly facing scoop 107 results in the production of a forward propulsive thrust by virtue of the phenomenon of intake propulsion.

The system of Figure 6 may be operated on several cycles, but the following typical cycle will be sufficiently illustrative for present purposes. It will be assumed, first, that only the exhaust passage 92 is to be used, the alternate passage 93 being either omitted, or valve 96 held closed, which may be accomplished by adjusting the compression of its spring to sufficient stiffness. During the expansion stroke of engine 91 (which may be assumed to be a four cycle engine), the valve 94 opens to permit discharge of exhaust gases to the head end of pipe 86, thus delivering a positive pressure pulse to the head end of fluid column 89. A wave of compression travelling with the speed of sound is hence launched down the fluid column, to be discharged or expanded into the enlarged capacitance chamber C by means of open pipe end 87. Because of the expansion, the open end of the pipe 89 reflects the wave as a wave of rarefaction travelling back up the pipe, and creating a negative pressure peak at the head end of the pipe at the time of its arrival. This wave of rarefaction is in turn reflected by the head end 88 of the pipe as a wave of rarefaction traveling back down the pipe toward the open end thereof. An inverse reflection again occurs at open end 87 so that a wave of compression now travels back up the pipe, to create a positive pressure peak at the time of its arrival at head 88, the engine 91 being timed so as to deliver another exhaust pulse in the pipe 92 at the same time. Thus, each time a positive pressure pulse returns at substantially maximum amplitude to head 88 by traveling along pipe 86, a new positive pressure is delivered to the head end of the pipe from engine chamber 90, and the two pulses combine or reinforce one another to produce an augmented pressure peak. With such timing of the engine 91, the system will evidently operate at resonance, with a pressure anti-node at P, and a velocity anti-node at V. According to this exemplification, therefore, the four-cycle engine 91 will be operated at a speed to assure delivery of exhaust pulses at the fundamental resonant frequency of the pipe 86. The pipe might also be resonated, however, by operating the engine to give its exhaust pulses at a frequency equal to either a multiple, or sub-multiple, of the fundamental frequency. Moreover, the engine 91 might equally well be of a two-cycle engine, it making no difference insofar as the present invention is concerned by what specific means the pressure pulses are delivered to the pipe 86, so long as they arrive at a resonant frequency of the pipe. If it is desired to make use of the second exhaust passage 93, the corresponding valve 96 may be timed to open before, after, or with the valve 94, as will be presently referred to in more particular.

Attention is directed to the fact that the standing wave established in the pipe 86, with its pressure anti-node P and velocity anti-node V located as described, assists in the performance of the cycle events of engine 91. Thus the negative pressure half cycle at zone P may partially overlap the scavenging stroke of the engine, and thus aid in scavenging. Since the negative pressure half cycle will overlap the intake stroke of the engine, again, by merely timing the exhaust valve 94 to remain open on into the intake stroke, this negative pressure may be utilized to assist in drawing the fuel charge into the combustion chamber, and may even be utilized to open the valve 98, the cam 98a in such case being assumed to be omitted. Finally, if the exhaust valve 94 remains open on into the combustion stroke of the engine, (or is omitted entirely), the rising positive pressure at zone P may assist initially in compressing the fuel charge within engine chamber 90.

It will be seen that exhaust gases are thus intermittently introduced to the pipe 86, and these will travel down the pipe at a velocity much lower than the previously mentioned waves of compression and rarefaction, to be introduced into chamber C, and finally discharged via either or both of outlets 100 and 101. Thus, there is what may be described as a "direct current" flow of gases down the pipe 86. During alternate half cycles of the standing wave in the pipe 86, when the direction of flow is "up" the pipe, or to the left as viewed in the figure, fluid is drawn into the pipe through its open end 87 from chamber C, and during the remaining half cycles, this fluid is discharged from open end 87 back into chamber C, so that an "alternating current" flow of gases is superimposed on the previously described direct current gas flow.

If the two exhaust passages 92 and 93 are used together, I find it desirable to adjust the system so that valve 96 opens near peak pressure at the beginning of the expansion stroke to relieve excess pressure in combustion chamber 90 and thus relieve detonation and excessive bearing load, while arranging the valve 94 to open somewhat later in the expansion stroke. In this manner, two pressure pulses may be applied to the fluid column 87 for each explosion in combustion chamber 90. These dual pressure pulses are preferably spaced to establish or promote the desired resonant condition in the fluid column. During that interval of the engine cycle between such delivered pulses, the system can be permitted to resonate at its natural frequency or harmonic thereof without supplying additional energy or, as suggested in Figure 5, intervening pulses can be delivered from another cylinder of the engine. If it is not desired that all of the exhaust gases be delivered through the sonic column, the cam 95 can be designed to open valve 94 for a short interval to obtain a pressure pulse during the expansion stroke, and a conventional exhaust valve 99a may be employed to be open and discharge separately to the atmosphere during the subsequent exhaust stroke of the engine.

The valve 94, exhaust passage 92 and the sonic column can be made to perform a valuable function relative to the normal operation of engine 91. For example, when the sonic column is operating at standing wave resonance, the system can be made to assist combustion chamber exhaust discharge by correlating the engine speed and the length of the fluid column 89 as to have this column resonate at an overtone or harmonic of the pressure pulses in the combustion chamber 90. Thus I may arrange the pipe 86 to be sufficiently short, for a desired engine speed, so as to have one, two, three or more pressure pulses appear at P between each pulse received from the passage 92 or the auxiliary passage 93. In this way it is possible to have an intervening negative pulse appear in the exhaust passage 92 shortly before the valve 94 closes and thus assist combustion chamber scavenging.

A desirable arrangement of a two cycle engine is to have the sonic column quarter-wave fundamental frequency a second overtone of the two cycle engine pulse frequency. In other words, if the column is sufficiently short, its fundamental natural frequency may be the second overtone of the engine exhaust frequency wave pattern. This means that there will be three negative pressure pulses in passage 92 for each engine exhaust pulse. The result is a strong scavenging wave shortly before the exhaust valve closes. Since pipe 86 is preferably a quarter-wave pipe, its length, for the second overtone, is 1/12 of the wave length represented by exhaust frequencies. With a four cycle engine, this harmonic or overtone will desirably be the third or fourth overtone of the fourth cycle engine pulse frequency.

Determination of the length of the fluid column 89 for resonance is quite simple, and this length should represent an odd multiple of 1/4 wave length of the standing wave in that portion of the fluid column which is within the pipe 86. Apparently the fundamental tone, or first quarter-wave, is the strongest pattern and, of course, the wave length mentioned above is determined by dividing the speed of sound in the exhaust gases by the frequency of the pulses. I find that the speed of sound in such exhaust gases is approximately 1500 to 1600 feet per second, increasing slightly with high temperature but apparently not being greatly affected by the peak pressure or mean static pressure determined by valves 100a and 101a.

I may, by adjustment of valves 94 and 96, vary the portion of energy extracted from the engine cylinder and utilized for sonic propulsion. In this connection, as in the other forms of the invention, it is often desirable to use a portion of the engine power derived from the crank shaft for creating a propulsion force by conventional means and to utilize another portion of the energy in the sonic system to supply an additional thrust. In this manner, for example in automotive, truck, or train operation, it is possible to effect a drive in part by a connection with the wheels and in part by using the sonic system. In aircraft propulsion, a portion of the propulsion may be utilization of a propeller driven by the crankshaft, another portion being derived from the sonic system. In other instances, it is desirable in aircraft use to take off and land while using primarily the conventional propeller system and shifting predominantly to the sonic system for high altitude, high-speed flight. In other instances, the sonic system can be arranged to create an upward thrust near the center of gravity of the aircraft to supply a vertical force tending to lift the aircraft.

It should be recognized also that this system of Figure 6 can be employed to advantage even if the valves 96 and 99a are rendered inoperative or omitted, in which event the entire volume of combustion products will be discharged into the sonic column, and even though the discharge orifice from the capacitance chamber C is not provided with a pressure-responsive or spring-loaded discharge valve. Simultaneous use of more than one passage between the pressure source and the sonic load, such as passages 92 and 93, has been proved to be an advantage when dealing with large energies. These multiple passages improve the wave front as disclosed elsewhere herein, and provide a mass reactance inertia as does the diaphragm of Figure 5. For example, all of the combustion products may be delivered to the sonic chamber and discharged from an orifice of the capacitance chamber C into the air or into the turbine T. In both instances, the discharge from the capacitance chamber may be rearward or sideward, and the length of the sonic column will preferably be such as to resonate at a fundamental or overtone of the frequency of explosions in the combustion chamber 90. It will be clear that the zone V represents a velocity variation zone (velocity anti-node) that there is very little change in pressure therein or in the capacitance chamber C. This has numerous advantages, particularly in aircraft use. It should be particularly noted that the exhaust energy has been transformed from a series of pressure pulses at zone P to kinetic energy at zone V, and that the pressure in the capacitance chamber C is substantially constant so that the exhaust gases or combustion products flow from the capacitance chamber C at a substantially uniform rate. In other words, if the capacitance chamber were not used, and the end V left open to the atmosphere, as previously suggested herein, there would be a large amplitude alternating flow at zone V flowing in and out of the end open to the atmosphere. This intake and discharge of atmospheric air causes, among other things, large noise generation. By this chamber means, the exhaust noises of an aircraft engine can be substantially completely eliminated for there are no violent changes in pressure at the discharge point to give rise to the objectionable audible pulses characteristic of the usual exhaust from an airplane engine. It will be apparent also that the action of the turbine T is very substantially improved because the inflow of combustion products thereto is substantially uniform in pressure and flow as the capacitance chamber C represents a zone in which the pressure is substantially constant. It should be noted also that such a system, even if not employing the turbine T, is of value in preventing flame discharge from the ultimate exhaust-gas-discharge port of the system due both to the lengths of the fluid column and air addition by the sonic pumping characteristics thereof. This is of particular advantage in the elimination of visible "tail flame" from the exhaust ports of a conventional aircraft engine and results not only in the elimination of objectionable visible flare during night flying but also in the elimination of a fire hazard. It should be understood that the advantages discussed in this paragraph apply also, and somewhat proportionally, to those systems in which only a portion of the exhaust gases is discharged into the sonic column.

Reference is next directed to Figure 7, showing a modification characterized by the employment of a flexible diaphragm located in the head end region of the resonant tubing and arranged to separate the combustion space therein from the fluid column. The fluid column in this instance does not include products of combustion, and no capacitance chamber is employed.

In the modification shown in Figure 7, numeral 109 designates generally a resonant housing or cavity, which in this instance includes a cylindrical pipe 110 having a somewhat flared open end 111 constituting a passage or orifice, through which air is alternately drawn in and then discharged, and having a flange connection 111a at its opposite end with head 112 forming a somewhat restricted combustion space 113.

Mounted between the rearward or flanged end of the pipe 110 and the head 112 is a piston type flexible diaphragm 114 consisting of a relatively rigid central piston portion joined by an elastic compliance or yieldable element 115 to a marginal rim portion which is clamped between the adjacent flanges on the pipe 110 and the head 112.

This diaphragm has a finite mass, and its compliance gives it stiffness, whereby a return stress is developed upon deformation in either direction from its normal median position. Having both mass and stiffness, the diaphragm becomes a vibratory system possessing a resonance frequency, and it is usually tuned to a frequency somewhat higher than the fundamental frequency of the resonant housing 109 because this choice of tuning tends to improve coupling between the two systems. As will later appear, this diaphragm oscillates in step with the frequency of combustion within chamber 113, being driven by that combustion, and operates to transmit the pressure pulses developed in the combustion chamber to the fluid column within pipe 110.

Cooperating with a suitable valve seat formed within head 112 is an intake valve 116 supplied with a combustible mixture through a pipe 117 to which the mixture is fed from a supercharger 118, the mixture being formed by a suitable carburetor 119. Also cooperating with a suitable valve seat formed within the head 14 is an exhaust valve 120 controlling the flow of exhaust gases through a passage 121. The intake and exhaust valves are operated in suitable sequence by cams 122 and 123, respectively, on a cam shaft 124 which drives the supercharger 118 and magneto 125, and which is driven by a cam shaft drive means 126 which may be any speed-governed drive, such as an electric motor, internal-combustion engine, turbine, etc. As an alternative or supplementary fuel supply means, there may be provided a fuel injector pump 127 driven from cam 128 on cam shaft 124 and acting to meter a liquid fuel directly into the combustion chamber 113 through a suitable spray type injection nozzle 129. Fuel can be mixed with the air in the carburetor 119 to form a lean mixture delivered to the combustion chamber through intake valve 116, and additional fuel in liquid state can be supplied, preferably during periods of high pressure in the combustion chamber, by use of the injector pump 127. Alternatively, the carburetion system or the injection system may be utilized individually, and if it be desired to inject all of the fuel into the combustion chamber, the necessary air for combustion will be supplied through the intake valve from the supercharger 118. Of course, the magneto 125 and cams 122, 123 and 128 should be arranged to provide the desired sequence of events including introduction of fuel, ignition (as by use of spark plug 130 connected to magneto 125) and exhaust of the combustion products. In this connection, the angular relationship of the means operating the magneto and valves from the shaft 124 can be made adjustable, for instance, by using the standard spark advance mechanism of the type incorporated in conventional magnetos.

The events of the operating cycle include, in sequence, (1) delivery of the fuel charge to the chamber 113 upon opening of the intake valve and movement of the vibratory diaphragm 114 toward the right, (2) compression of the admitted fuel charge upon return movement of the diaphragm (toward the left), (3) ignition of the fuel charge and consequent creation of a positive pressure pulse which drives the diaphragm back toward the right, causing the pressure pulse to be transmitted to the fluid column, and (4) opening of the exhaust valve and return of the diaphragm to scavenge the combustion chamber. The intake valve 116 preferably opens a short interval of time before the exhaust valve 120 closes, thereby scavenging exhaust gases from the combustion chamber in a manner similar to "valve over-lap" timing utilized in conventional internal combustion engines. If additional fuel is desired by injection, the pump 127 preferably injects it during either the "intake" or "compression" events.

The speed of the cam shaft 124 is so regulated that the explosions or pulses generated in combustion chamber 113 occur at such timed relationship as will establish a condition of standing wave resonance in the fluid column within the pipe 110, the pipe behaving substantially as a quarter-wave organ pipe, with a pressure anti-node region P adjacent the closure formed by diaphragm 114, and with a velocity anti-node V at the open end 111. It will, of course, be understood that for a pipe 110 of given length, there will be a corresponding explosion frequency necessary to establish the desired resonant operation, and the cam shaft 124 is driven at a speed to achieve such a condition. One method of accomplishing this purpose is to note the peak reading of a pressure gage 131 communicating with the pressure anti-node region P of the apparatus. This gage will obviously show a maximum reading at resonance. The reading on the gage 131 will indicate the magnitude of the thrust, since this thrust results, at least in part, from the action of each wave pulse against the diaphragm 114.

It may be noted in connection with the establishment of the pressure anti-node P that the diaphragm 114 should be stiff enough to reflect pressure waves or pulses returning to it from the open mouth 111 of the tube in the general manner of the closed end of a quarter-wave organ pipe. In view of the travel of the diaphragm, a region P of zero-to-and-fro oscillation cannot be achieved, but a substantial pressure anti-node P is established. This means, in effect, the creation of a zone P which is of high acoustic impedance (large ratio of pressure amplitude to velocity amplitude).

If the diaphragm 114 had negligible mass and stiffness, it would move at all times in such a manner that the pressure cycle at the anti-node P would be in phase with the pressure cycle in the combustion chamber 113. Assuming, however, a finite mass for the piston and a compliance of suitable stiffness, a phase lag is introduced between the pressure events in the combustion chamber and those transmitted to the end of the fluid column. Operation may then be as follows:

The explosion within chamber 113 creates a pressure disturbance producing a positive pressure pulse which moves diaphragm 114 to the right, thereby transmitting the positive pressure pulse to the end of the fluid column within the pipe 110 and thence toward the right along the fluid column the wave traveling with the speed of sound to the open end 111 of the pipe, which expands it into the open atmosphere. Normally the diaphragm will be substantially at its extreme position toward the left at the instant of explosion. At a time substantially 90° following the explosion, the diaphragm passes through the mid-position of its forward or power stroke travel toward the right, and at such time transmits peak positive pressure to the closed end of the fluid column. The diaphragm will thereafter complete its stroke to the right and then move through a return stroke (leftward) by virtue of the energy stored in its stressed compliance.

The positive pressure pulse launched down the pipe by the described forward stroke of the diaphragm is reflected from the open end of the pipe as a negative pressure pulse (wave of rarefaction), the peak of which arrives at the diaphragm one half cycle after the positive pressure pulse peak at the diaphragm and just as the diaphragm is at the mid-point of its return stroke (leftward). The diaphragm continues toward the left, and this movement together with the negative pressure pulse already mentioned creates a substantial pressure depression in the region immediately to the right of the diaphragm. The said return stroke of the diaphragm (toward the left) operates to scavenge the combustion chamber, the exhaust valve 120 being open at this time. The described negative pressure pulse is reflected by the diaphragm as a negative pressure pulse moving toward the right, which is reflected from the open end to return a half-cycle later as a positive pressure pulse that arrives at the diaphragm with peak positive pressure as the diaphragm passes with maximum velocity through the mid-position on its next forward stroke (toward the right). A positive pressure peak is thus built up to the right of the diaphragm, while a suction is created within chamber 113 by which fuel is taken in through the then open intake valve 116. A positive pressure pulse is then reflected from the diaphragm, and returns a half cycle later (after reflection at the open end) as a negative pressure pulse reaching the diaphragm with peak pressure as the latter passes through the mid-position of its compression stroke (leftward). The negative pressure pulse is in turn reflected by the diaphragm and a half-cycle later will return from the open end as a positive pressure pulse arriving with peak positive pressure just as the diaphragm passes through its mid-position on the succeeding "power" stroke. A positive pressure peak will thus again be created to the right of the diaphragm as the diaphragm crosses the mid-point of its forward power stroke, and the succeeding cycle proceeds as before. The maximum pressure in the chamber 113 occurs instantly after the explosion, when the diaphragm is in its extreme leftward position. The maximum positive pressure in the region immediately to the right of the diaphragm occurs 90° of the cycle later, with the diaphragm at the half-way point of its return stroke, moving with maximum velocity. The pressure wave at the head end of the fluid column in tubing 110 thus lags by 90° the pressure events in the combustion chamber, the intervening diaphragm functioning as a coupling introducing substantially a 90° phase lag.

Thus, briefly summarizing, as every alternate positive pressure pulse launched down the pipe from the combustion space 113 and diaphragm 114 returns as a reflected positive pressure pulse, a new explosion has occurred to build an augmented positive pressure peak and launch a succeeding positive pressure pulse. Intervening positive pressure pulses return to the diaphragm 114 at intervals of one cycle to build intervening positive pressure peaks. The negative pressure pulses arriving at the diaphragm augment the negative pressure "dips" produced by the diaphragm, and thus strengthen the wave. The pipe 110 accordingly behaves as a quarter-wave organ pipe, cyclically excited by intermittent combustion generated impulses at a sub-multiple (here one-half) of its resonant frequency. In accordance with quarter-wave pipe theory, a standing wave is established in the pipe, with a pressure anti-node P adjacent the diaphragm 114, and a velocity anti-node V at the open end or tail 111. At the pressure anti-node P, as well as within the combustion zone 113, alternate positive and negative pressure peaks are experienced, and these create a radiation pressure thrust on the diaphragm in accordance with principles already explained. At the pressure anti-node zone P, to-and-fro oscillation of the fluid is, of course, minimized. At the velocity anti-node region V, however, the air moves to-and-fro into and out of the open end of the pipe with substantial amplitude. Outside air is alternately drawn into the end of the pipe from virtually all directions, and expelled as a net flow in a rearward axial direction, thereby creating a thrust by jet discharge, with a closed system, i. e., one having no through flow of fluids from one end of the pipe to the other.

The diaphragm 114 affords a coupling mass between the combustion zone and the fluid column which serves to increase the "Q" of the system, and at the same time provides the further advantage that products of combustion are kept separate from the standing wave column, which results not only in further augmented "Q," but also in an unheated fluid column, which hence becomes substantially shorter for a given wave frequency. Also, the thermal or expansion-ratio efficiency of each subsequent expansion is a maximum because, owing to the use of the diaphragm, each pressure pulse can quite easily be expanded, not merely to mean pressure, but to a substantially zero pressure-negative pulse.

Control of the magnitude of the thrust is possible by change from a truly resonant condition, by adjustment of spark timing, by control of the amount of fuel, etc. It is particularly desirable to be able to adjust the angular relationship between the magneto and the valve cams in order to obtain a desired correlation between the valve actions and the wave pulse.

At this point it might be well to point out that the direction of thrust obtainable in the various embodiments of the invention can be determined by the direction of extension of the sonic column means. In the propulsion of vehicles, it is often desirable to be able to produce directional thrusts for purpose of guiding, braking, etc. The sonic means can be pivoted to one side or the other to determine the directional application of force to the pivot axis which, if properly correlated to the center of gravity of an airplane or properly correlated with a wheel structure of a wheeled vehicle, can be made to change the direction of motion thereof.

In the embodiment of Figure 8, the resonant pipe 132 has a flared open end 132a, and has at its opposite end a head or closure 132b which may be similar to the head 112 of the embodiment of Figure 7. Adjacent to this head is the combustion chamber region of the system. The fuel intake passage is controlled by intake valve 133, or a fuel charge may be injected by injector nozzle 134, these members being operated by mechanism similar to that previously described in connection with Figure 7. Likewise, the charge is ignited by a similar magneto 136 and spark plug 137. Note that both the valve 133 and a later described intake check valve 142 are disposed in a common plane normal to the axis of the pipe 132, which arrangement results in the generation of a pressure wave in the form of a plane normal to the axis of the pipe.

Utilizing only the elements thus far mentioned, the operation of the embodiment of Figure 8 can preferably involve a "two-pulse cycle" principle as follows: Assuming a resonant condition in the fluid column 132 and the consequent appearance in pressure anti-node zone P of positive pressure pulses with intervening negative pressure pulses, it is desirable to introduce the charge into the zone P upon the appearance of each negative pressure pulse, and this can be accomplished by proper timing of intake valve 133. It will be clear that, during this negative-pressure pulse or rarefaction in the zone P, the pressure therein will be less than the pressure developed by the supercharger, here indicated by the numeral 135, so that a combustible mixture will enter the zone P. Thereafter, the pressure in zone P tends to build up to a maximum value due to the resonant standing wave pattern in the fluid column 132. As this pressure pulse builds up, it compresses the charge and the ignition system is timed to ignite the charge near the instant of maximum pressure to increase further the pressure pulse and reinforce the pressure pulse resulting at P from the resonant condition.

If it is desired to inject the fuel into the zone P separate from the air or in a manner to supplement the fuel introduced through the valve 133, this is done through the injector nozzle 134, as previously described, and at a time during the existence of a pressure pulse in the zone P. Fuel can thus be introduced through the injector nozzle 134 just prior to instigation of ignition by the spark plug 137 or at any time in the cycle at which the pressure in zone P is increasing. In some instances, it is even possible to dispense with the spark plug 137 and establish pressure waves of sufficient magnitude to bring the air to fuel-ignition temperature, the fuel being injected thereinto through the injection nozzle 134 during the presence of such ignition temperatures, all in a manner similar to the operation of semi-Diesel engines. In exhaustive test operation, I have established that one self-ignition feature of Figure 8 is explained by a lingering flame around the rim of the illustrated flattened combustion chamber, not blown out because of the "center-core" flow from the somewhat centrally located multiple intake valves 133 and 142, as shown.

Such a system resembles the embodiment of Figures 1–4, in that it combines sonic and combustion principles in a novel manner and utilizes no piston or diaphragm for compressing the charge. Instead, compression and ignition are effected by the pressure variations of a sonic column, a principle which I believe to be fundamentally new. The system not only avoids the use of pistons or diaphragms but even permits elimination of the mechanically-operated intake valve 133, if this is desired, utilizing instead a spring-loaded valve which opens whenever the pressure in the zone P is below the pressure in the induction piping, as suggested in Figures 1 and 2.

I find it particularly desirable to apply sonic energy to a combustion zone. The "piston action" of the acoustic inertia of the sonic wave permits high-pressure combustion without the employment of fast-moving pistons. Particularly when using a flat-ended combustion chamber with a parallel screen of fuel spray forming a "sandwich" such as shown it is possible to generate a plane wave front which is effectively a piston confining the combustion against the reflector.

In this embodiment of the invention (Figure 8), the combustion products must, of course, move along the fluid column and they are conveniently discharged from the system at some zone which does not correspond to a zone of maximum pressure variation and which is preferably near a zone of maximum velocity variation. Most conveniently, this can be accomplished by discharging the combustion products from the capacitance chamber 139, using, for example, a spring-loaded discharge valve, indicated by the number 140. Such a valve is shown at 140, discharging sidewardly from chamber 139 to a turbine-compressor unit 140a useful for various purposes, and illustrating the applicability of the system as a compressor or pump. Another, or alternative, spring-loaded discharge valve 140b is shown to discharge rearwardly from chamber 139, giving a jet discharge useful in the jet propulsion application of the invention. On the other hand, if it is desired to discharge combustion products from zone P in Figure 8, a valve such as 120 in Figure 7 may be used, preferably opening at mean pressure which is one quarter wave length in time after peak pressure.

The operation of the system can be further improved by employing an auxiliary non-resonating means connecting the capacitance chamber 139 to the zone P. Pipe 141 is shown in this connection, one end openly communicating with the capacitance chamber 139 and the other end communicating with the zone P through the spring-loaded intake check valve 142. This pipe is made of such length as not to resonate at the frequency of the fluid column 132 and this lack of resonance may be further insured by incorporation of a capacitance chamber 144 in the pipe 141. A large portion of the net thrust in this embodiment is developed in zone P through intake action at the head. It may be desirable to decrease the intensity of rarefactions in zone P; this can be aided by the non-resonating pipe 141 which transmits existing pressure in the chamber 139 (existing through use of the spring-loaded valve 140 or because of minor sonic variations in pressure therein) to the zone P. The valve 142 opens whenever the pressure in the zone P is lower than that in the pipe 141, thus tending to absorb the rarefactions by intake of gases. Of course, the amount of combustion products thus returned to the zone P should not be to an excessive exclusion of incoming air, and it is desirable to correlate the absorption of rarefactions by flow through the valve 142 with the intake of air through the valve 133 so that the rarefaction or negative-pressure pulse will not be entirely absorbed by the previous entry of gases from 142 and defeat the entry of the requisite air required for combustion. It will be apparent that such desirable results can be obtained by proper correlation of the pressures in pipe 141 and the air induction passage, as well as by correlation of the action of the valves 133 and 142. I have observed during actual operation that one benefit of this system is the previous entry of combustion products acting as a screen ahead of entry of mixture through valve 133 thus apparently preventing backfire. It will be apparent also that it is not always necessary to employ the non-resonating return from the capacitance chamber 139, particularly as the rarefactions can be very substantially reduced in the zone P even by entry of the requisite air for combustion.

In addition, such as for greater "intake propulsion", I may employ an automatic intake valve 145, suitably spring-loaded, to admit air or other gas to the capacitance chamber 144 when the negative pressure wave therein (created usually because of opening of the valve 142) is below the pressure in supply scoop 146 by an amount determined by the spring loading. I have found that, if automatic intake valve 145 is sufficiently large, the passage formed by pipe 141 may be reduced to a very small size because necessary flow therethrough is reduced. In other words, valve 145 can quite easily supply the major portion of the demand of valve 142 if each opening of valve 142 generates a sufficiently large amplitude negative wave in chamber 144 to open valve 145.

Figure 9:
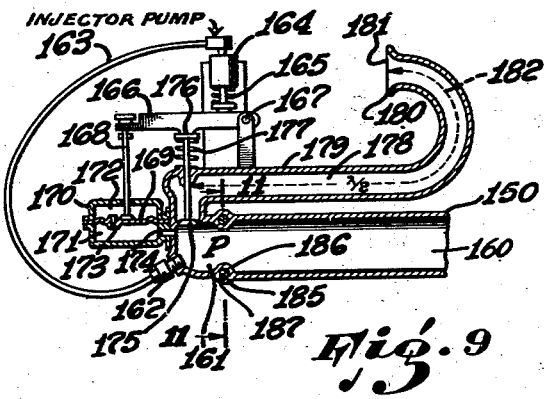
Figures 9 and 10 show, in longitudinal section, two modified forms of wave-controlled combustion means in accordance with the invention, the sonic columns being shown only fragmentarily.
Figure 11:
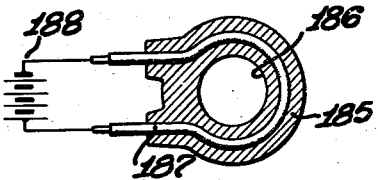
Figure 11 is a sectional view taken on line 11—11 of Figure 9.

The embodiment of Figure 9 shows another form of wave-controlled combustion means, the usual quarter wave pipe housing the fluid column being fragmentarily indicated by the numeral 150. This embodiment is of the injection type, fuel being introduced into a combustion zone 161 through an injection nozzle 162 connected by a fuel line 163 to a short-stroke injection pump 164 which delivers a charge of fuel each time a plunger 165 thereof is raised. The injection pump 164 is actuated by an arm 166 pivoted at 167 and operatively connected to a rod 168 attached to a diaphragm 169. This diaphragm traverses a housing 170 forming chambers 171 and 172 therein, and which chambers are in restricted communication through a small orifice 173 which conveniently can be disposed in the diaphragm itself. The chamber 172 is substantially sealed from the atmosphere at the junction of the rod 168 and the housing. The chamber 171 is in relatively open communication with the combustion zone 161 through an orifice 174 which is larger in size than the orifice 173.

An intake valve 175 opens into the combustion zone 161 and provides a stem terminating in a pressure plate 176 disposed to be contacted by the arm 166 to open the valve 175 against the action of a valve spring 177. The valve 175 controls the flow of air from an air induction passage 178 formed by an intake pipe 179, the far end of which is preferably bent and flared, as indicated by the numeral 180, to provide a mouth 181 facing the air stream created by motion of the device. It is very desirable that this intake pipe 179 be of a length corresponding to one half wave length, as indicated by the λ/2 dimensional arrow shown by dotted lines 182.

This embodiment employs no spark plug to instigate combustion, and compression in the combustion zone 161 (established by the sonic increase in pressure in the fluid column 160) may be sufficient to cause ignition. However, to aid this action, the combustion chamber may provide a collar-like member 185 providing a slightly restricted passage 186 opening on the combustion zone 161. The member 185 is designed for low heat radiation so that a portion of it remains quite hot from exposure to combustion. The heat of this member will be sufficient, at the value of the pressure pulses in the sonic column, to ignite the fuel in a manner somewhat similar to that employed in so-called "hot tube" or "hot head" combustion engines. In practice, I have discovered that the restriction formed at 186 is effective in reducing radiation of heat to valve 175 from points downstream of the restriction. To aid in the starting of the device, it is often desirable to heat the member 185 by auxiliary means, and an annular electric heating element 187 can be used within or adjacent the member 185 to supply initial heat for starting, this electric element being exemplary of various heating means which can be used. A source of electric current 188 causes current to flow through the element 187, thereby heating it.

The operation of this embodiment is as follows: An explosion in zone P, caused by burning fuel in the combustion zone 161, established a pressure pulse which travels at the speed of sound through the fluid column 160 to the far end, where it is reflected to re-traverse the fluid column toward the zone P, in the manner characteristic of quarter wave resonance. Assuming that another combustible charge has, in the meantime, been introduced into the combustion zone 161, the reflected positive pressure pulse arriving in proper phase as explained for Figure 1 will, aided by the heat of the member 185, initiate another combustion in properly timed relationship with the arrival of this pressure pulse at zone P. It should be clear that the subsequent pulse is created only upon the reappearance of the previously-produced pulse and that, correspondingly, the system is self-resonating.

As postulated by fundamental laws, a rarefaction or negative-pressure wave tends to appear at P between successive positive-pressure pulses. Such a rarefraction momentarily reduces the pressure in diaphragm chamber 171 through use of the intercommunicating passage 174. Because of the wave-damping action of the more restricted passage 173, chamber 172 remains at substantially means pressure, thereby urging the diaphragm 169 downward and drawing the arm 166 downward to open the intake valve 175 and permit entry of air through the air induction passage 178. Correspondingly, air is admitted upon each appearance of a rarefaction in zone P in a manner tending to absorb the rarefaction and increase the net thrust by intake propulsion. The air intake valve 175 will close before the appearance of a subsequent pressure pulse by increase in absolute pressure in the chamber 171 and leakage through the passage 173. As the pressure pulse increases the pressure in the combustion zone 161 above mean pressure value, the diaphragm 169 is moved upward and the arm 166 leaves contact with the pressure plate 176 and forces the plunger 165 of the pump 164 upward to inject fuel through the injection nozzle 162. As previously mentioned, when the pressure in the combustion zone 161 reaches a sufficiently high value, with reference to the existing temperature, combustion occurs.

This embodiment is completely operative irrespective of the presence of an air induction passage 178 of a length corresponding to one half wave length. However, somewhat better results can be obtained by use of this pipe, both because of the increase in the air pressure through impact, assuming that the system is moving, and because the air induction passage 178 can be made to resonate with the fluid column 160. The length of the air induction passage 178 is such that each negative wave created by opening intake valve 175, and traversing passage 178 to be inverted to a positive wave by inertia action at mouth 181, returns as a positive wave pulse at the subsequent opening of valve 175. In this way induction is enhanced.

Figure 10:
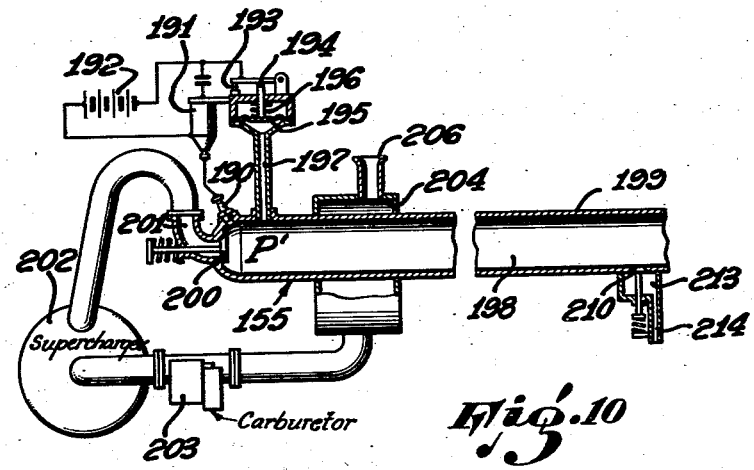

Referring particularly to Figure 10 the wave-controlled combustion means 155 is of slightly different construction illustrative of a modification which can be used. Here, ignition of a charge is instigated between the contacts of a spark plug 190 so that there is no necessity for providing a "hot spot" similar to that provided by the member 185. The spark plug 190 is connected to the high voltage terminal of a conventional induction coil 191, the low voltage circuit of this coil including a source of potential 192 and a make-and-break switch 193 similar to that employed in conventional automotive practice. The switch 193 is actuated by a plunger 194 connected to a diaphragm 195 urged downward by a spring 196, the lower side of the diaphragm communicating through passage 197 with the fluid column 198 in fragmentarily illustrated quarter-wave pipe 199 at zone P'. Correspondingly, upon the appearance of a pressure pulse at P', the diaphragm 195 moves upward to open the switch 193 and break the low voltage circuit, thus inducing in the high tension winding a potential sufficient to cause the spark in the spark plug 190. Correspondingly, these sparks will be synchronized with and by the appearance of the pressure pulses in the zone P'. By properly adjusting the spring 196, ignition can be made to take place at any desired point of the pressure-increasing wave, thus assuring a reinforcing explosion to amplify the pressure wave reaching the zone P'.

In this embodiment, a combustible mixture is introduced into the zone P' through an intake valve 200, which may be of the spring-loaded type, as suggested in Figure 10, so that it opens whenever the pressure in a fuel induction passage 201 exceeds the pressure in the zone P' by a predetermined amount, thus insuring delivery of a combustible mixture during periods of rarefaction at zone P', the charge being later ignited upon appearance of the following pressure pulse at this zone.

A supercharger 202, driven by means not shown, supplies the air-fuel mixture to the fuel induction passage 201. A carburetor 203 forms and delivers an air-fuel mixture to the intake of the supercharger 202. The air entering the carburetor 203 moves through a pre-heater 204, shown as comprising a jacket around pipe 199 and to which air is supplied through a mouth 206, thus obtaining a desirable heat exchange between the incoming air and the fluid column 198. I have found that, if the area of the valve 200 is sufficiently great relative to the mass of the valve and if the supercharger discharge pressure supplied thereto is sufficiently great, the valve 200 will function to open upon the appearance of each rarefaction in the zone P' without the aid of mechanical drive means, such as exemplified by the diaphragm 169 of Figure 9. This valve 200 (like many of the previously-described valves) comprises a wave-operated valve, being opened and closed in response to changes in wave pressure, and does not rely for its operation upon anything equivalent to "water hammer" surge characteristics. I have discovered that, due to the quickness of completion of combustion under the conditions of sonic turbulence and also due to the flame extinguishing characteristics of each negative wave, each combustion wave is either extinguished or swept substantially down the fluid column before intake valves, such as 175 or 200, are opened.

Figure 12:
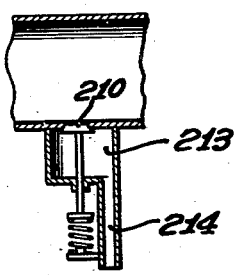
Figure 12 is an enlarged fragmentary view of an exhaust valve of Figure 10.

It should be further apparent that any such system must discharge the combustion products from the fluid column. Such discharge should preferably be near a zone where pressure variations in the fluid column are at or near a minimum, e. g., at points removed one quarter wave length, or an odd multiple thereof, from the zones P or P'. Discharge of combustion products can be effected from a velocity anti-node at the far end of the column, also through a spring-loaded discharge valve 210, located preferably near a point of maximum velocity variation being typically constructed as shown diagrammatically in Figure 12, to discharge the combustion products through a chamber 213 and an orifice 214. Alternatively, discharge of combustion products may include use of a plurality of such valves.

Figure 13:
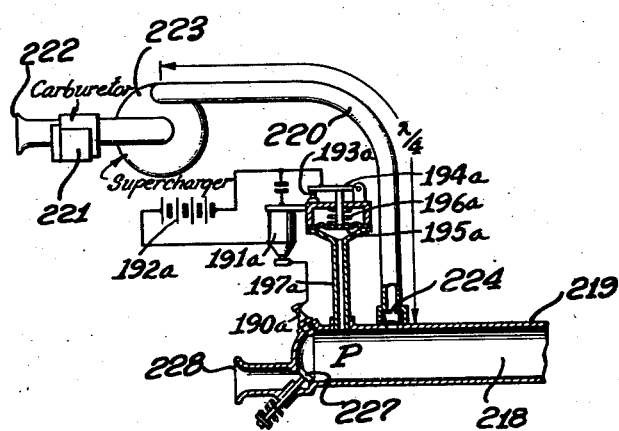
Figure 13 is a view similar to Figure 9 showing an alternative combustion means, and showing a quarter-wave, valveless intake means which may be used in connection with various embodiments of the invention.

Referring now to Figure 13, I find it possible to employ a simplified system, with no mechanically-actuated intake valve means. This is made possible by delivering to the resonant fluid column 218 in fragmentarily illustrated quarter-wave pipe 219 air, or a combustible mixture, through an induction pipe 220 of a length corresponding to one quarter wave length, or odd multiple thereof. A quarter-wave length pipe delivering air or a combustible mixture to the zone P of maximum pressure variation can resonate with the fluid column 218 so that the far end of this quarter-wave length pipe experiences substantially no changes in pressure. As indicated in Figure 13, this far end of the pipe can communicate directly with a carburetor 221 to which air is supplied through a forward-facing mouth or scoop 222, or a supercharger 223 can be interposed. With such a system, there is no need for using an intake valve adjacent the zone P, though it is desirable that a flame arrestor be utilized in the pipe 220 adjacent the zone P, as suggested by spaced screens 224 in Figure 13. This is an additional precaution against backfiring into the quarter wave pipe 220, from the powerful pulses of tuned sonic path 218.

The pressure-actuated ignition system shown in Figure 13 is substantially the same as that shown in Figure 10 and need not be described in detail, beyond to note that its several components (identified by reference numerals similar to those employed in Figure 10, but with the suffix $a$ added) have the same functions as in the case of Figure 10.

Since the quarter wave pipe 220 delivers its charge at a substantially constant rate (positive and negative pulses on opposite sides of fire screen 224 neutralize each other by interaction between the two tuned systems) an auxiliary intake check valve, such as 227, will be useful to cancel negative waves by periodic intake jet at zone P. As previously described, such an intake check valve may receive air or gas from a scoop 228 and may be suitably spring-loaded.

By use of the quarter wave pipe 220 of Figure 13, it is possible to use the supercharger 223 to maintain a mean pressure throughout the fluid column 218. Likewise, spring-loaded valves through which the combustion products may be discharged can serve in this capacity. By use of a quarter-wave length intake pipe, there are substantially no pressure fluctuations at the discharge of the supercharger 223 and, correspondingly, there is no interference between the supercharger and the sonic system. The supercharger can be supplied with atmospheric air or with a fuel-air mixture at substantially constant pressure, the supercharger serving to increase this pressure preparatory to deliver to the quarter wave length pipe 220.

Figure 14:
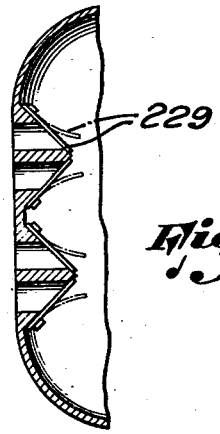
Figure 14 is a sectional detail illustrating the use of reed-type flap valves in the invention.

It should be distinctly understood that the invention is not limited exclusively to the creation of wave motion by use of explosions. There are various ways of establishing such waves, such as by use of pistons, orifices or reeds vibrating in response to uniform air blasts to operate in my sonic system as does valve 227 of Figure 13. Figure 14 illustrates the excitation end of a sonic column in which the ordinary tappet valves, such as 142 and 133 in Figure 8, are replaced by inwardly opening reed flaps 229. Figure 15 illustrates a piston type means for exciting a sonic column. Piston 230 is reciprocated in cylinder 231 to produce alternate compressions and rarefactions within a sonic pipe, the end 232 of which is shown. In addition, pressure pulses may be generated by intermittently releasing increments of pressure-confined fluid into the zones indicated by the letter P or from the zones indicated by the letter V, such as shown in Figure 6.

Likewise, pressure pulses need not be introduced adjacent the reaction head but may be applied at a half-wave point therefrom, particularly if the column length be three or more quarter wave lengths. Thus in Figure 16, a pipe 300 open at one end 301 and closed at the other end by a head 302 which is equipped with air intake valves 310, is provided, at some point along its length, with conventional intermittent combustion means such as fuel injectors 162' and spark plug 190'. Preferably the pressure pulses generated by the combustion of fuel intermittently introduced through 162' occur at a point corresponding to a pressure anti-node (indicated by the letter $P_2$) within pipe 300. For instance $P_2$ may be located a half wave length from the closed end 302 and a quarter wave length from the open end 301.

It should also be understood that the invention is not in all instances confined to the employment of gas columns for wave transmission. It is within the contemplation of the invention to use any elastic fluid medium whether it be a liquid or a gas. Liquids permit high wave pressure with small displacements and, in this respect, are sometimes desirable. When using liquid, it is quite evident that separation from adjacent media, as by the diaphragm hereinsuggested, is sometimes unnecessary, this being particularly true with reference to the use of a liquid medium where the diaphragm is not essential for confinement thereof, e. g., at the top of a vertical column in which a liquid-gas interface can exist without use of a diaphragm separating these materials.

It should be recognized also that the invention is not limited to fluid columns which are of substantially uniform cross-sectional area throughout their lengths. While for many applications I prefer the straight-walled passages, certain modifications of passage of non-uniform cross-sectional area can be employed without departing from the spirit of the invention. Thus, for example, tapered or bottle-shaped passages can be employed, such as the pipe 350 illustrated to the right of broken line in Figure 17, providing, for instance, a modification of the straight walled form with an enlarged combustion chamber, including fuel and air introduction and ignition means as sown in other figures, which may be attached at the broken lines, at the forward end providing zone P, and with inward-tapering and rearward-extending walls so that zone V may be at the narrow end of the passage.

As a further example of a fluid column of non-uniform cross-sectional area along its length, the modification of Figure 18 illustrates another type of divergent column. The resonant column is defined by a cylindrical section 360 and a section 361 of generally conical form bounded at one end by spherical surface 362, the chamber defined by the walls of the latter section being more properly referred to as a spherical sector. An orifice 363 controlled by spring-loaded check valve 364 may be employed to discharge fluid from the end of the chamber 361. The head end of section 360 is closed by head 365, in which are fuel and auxiliary air intake passages 366 and 367, controlled by cam actuated valves 368 and 369, respectively, it being evident that passage 366 can be supplied with fuel under pressure by a supercharger and carburetor of exactly the same type as shown in Figure 7, these parts being omitted from Figure 18 merely for simplicity of illustration. The valves 368 and 369 may be actuated in proper timed relation by mechanism of the type indicated in the drawings and described in more detail elsewhere herein. The fuel feeding means may also be of various types such as disclosed in certain of the preceding embodiments. As a means for introducing auxiliary air to passage 367, I here indicate a forwardly reaching pipe 367a and air scoop 367b. As regards these provisions, it is sufficient to say that a combustion-induced pressure disturbance is caused to recur at pressure anti-node zone P at a frequency producing standing wave resonance in the cavity comprising cylinder 360 and spherical sector 361.

Considerable latitude is permissible in fixing the length of pipe section 360. In accordance with one mode of operation, pipe section 360 acts as a quarter-wave length resonator, and the traveling wave assumes a spherical front quite near the apex of sector 361 and diverges continuously until it reaches the spherical end 362 thereof. A velocity anti-node V of the standing wave occurs in this case close to the end of the cylindrical section 360, as indicated. It will thus be seen that the wave diverges beyond the point V, and will result in reduced energy density for reasons already described; and it will also be seen from what has already been described, that substantially or nearly constant pressure conditions may be established within the spherical sector, particularly in the region adjacent the discharge valve.

By shortening cylindrical section 360, the velocity anti-node V is displaced away from the end of section 360 and into sector 361. Since there is relatively less frictional loss at the walls and in the fluid itself in the enlarged cavity of sector 361 than in cylindrical section 360, the shortening of section 360 and the removal therefrom of regions of high particle velocity in the medium tends to increase the Q of the resonating system with resultant advantages discussed previously.

The engine of the invention has now been described with propulsion chiefly in view, but also with alternative uses indicated, e. g., as a blower or compressor. The engine however has still other uses predicated upon the unusual effectiveness and high efficiency of the chemical reaction produced and regulated by sonic action at a pressure anti-node zone (usually a quarter-wave length from the open end of the apparatus). Because of the remarkable completeness of combustion and the high thermal efficiency resulting from the sonic burner action, the apparatus may be regarded, in one aspect, as a burner of unusual effect, useful for many purposes.

Various changes and modifications will be apparent to those skilled in the art of sonics from the exemplary explanations herein given and can be made without departing from the spirit of the appended claims.

Reference is here made to the following continuation-in-part applications based on my said parent applications Serial Nos. 439,926 and 521,575: Serial No. 728,766, filed February 15, 1947 for Standing wave jet propulsion apparatus with valveless air intake conduit; Serial No. 753,898, filed June 11, 1947 for Pulse jet standing wave engine with movable wave reflecting means; Serial No. 754,559, filed June 13, 1947 for Standing wave heat engine with means for supplying auxiliary air; Serial No. 1,733, filed January 12, 1948 for Multi-circuit quarter wave pulse jet engine; and Serial No. 447, filed January 3, 1948 for Resonant pulse jet engine with tapered pipe, allowed June 3, 1949.

I claim:

1. A method for producing a propulsive thrust, which method includes the steps of: applying a plurality of pressure pulses to a substantially quarter wave fluid column terminated at one end by a wave reflector and opening at the other end to the atmosphere; controlling the frequency of said pressure pulses to generate a wave length substantially four times the length of said fluid column to establish in said column a pressure anti-node region near said reflector and a velocity anti-node region near said open end; admitting additional fluid to said column; and propelling a net flow of fluid from the open end of said column in response to said pressure pulses.

2. A method for producing a propulsive thrust, which method includes the steps of: applying a plurality of pressure pulses to a substantially quarter wave fluid column terminated at one end by a wave reflector and open at the other end to the atmosphere; controlling the frequency of said pressure pulses to generate a wave length substantially four times the length of said fluid column to establish in said column a pressure anti-node region near said reflector and a velocity anti-node region near said open end; admitting additional fluid to said column near said pressure anti-node during periods of rarefaction; and jetting said additional fluid from said open end.

3. A method of producing a propulsive jet, which method includes the steps of: establishing a standing sound wave in a fluid column within a quarter wave pipe with a pressure anti-node region within the closed end and a velocity anti-node region near the open end; admitting to and burning in said closed end increments of fuel; and jetting products of combustion from said open end to cause movement of products of combustion along said fluid column during the existence of said standing wave therein and to produce a propulsive jet.

4. A method as defined in claim 3, including the additional step of supplying to said fluid column adjacent said pressure anti-node region an amount of air greater than that required for combustion of said fuel and in such manner that the mass of such excess amount of air is accelerated to increase the mass rate of discharge in said propulsive jet.

5. A method as defined in claim 3, including the additional step of restricting discharge sufficiently to maintain a high mean pressure in said column of fluid.

6. An apparatus of the character described which includes: a housing defining and containing a column of fluid adapted to have a standing wave established therein, pressure wave reflecting means at one end of said column, pressure wave expanding means embodied in said housing terminating the other end of said column, pressure disturbance means in pressure transmitting relationship with said fluid column operative at a resonant frequency of said fluid column to establish a resonant standing wave therein, said reflecting means establishing a pressure anti-node of said standing wave adjacent said one end of said fluid column, and said wave expanding means establishing a velocity anti-node of said standing wave substantially nearer to said other end of said column than to said one end, and inflow and outflow fluid passage means in said housing directing a net flow of fluid which is propelled in response to pressure variations of said standing wave.

7. An apparatus of the character described which includes: a housing defining and containing a column of fluid adapted to have a standing wave established therein, said housing including an end wall adjacent one end of said column adapted to function as a pressure wave reflecting means, pressure wave expanding means embodied in said housing terminating the other end of said column, and pressure disturbance means in pressure transmitting relationship with said fluid column operative at a resonant frequency of said fluid column to establish a resonant standing wave therein, said end wall establishing a pressure anti-node of said standing wave adjacent said one end of said column and said wave expanding means establishing a velocity anti-node of said standing wave substantially nearer to the other end of said column than said one end, and inflow and outflow fluid passage means in said housing directing a net flow of fluid which is propelled in response to pressure variations of said standing wave.

8. An apparatus of the character described which includes: a housing defining and containing a column of fluid adapted to have a standing wave established therein, said housing including an end wall adjacent one end of said column adapted to function as a pressure wave reflecting means, a fluid intake valve opening to said one end of said column, pressure wave expanding means including a fluid outlet embodied in said housing terminating the other end of said column, and pressure disturbance means in pressure transmitting relationship with said fluid column operative at a resonant frequency of said fluid column to establish a resonant standing wave therein, said end wall at said one end of said fluid column establishing a pressure anti-node of said standing wave thereadjacent, and said wave expanding means establishing a velocity anti-node of said standing wave substantially nearer to said other end of said column than to said one end.

9. An apparatus of the character described which includes: a housing defining and containing a column of fluid adapted to have a standing wave established therein, pressure wave reflecting means at one end of said column, there being a fluid opening located at the other end of said column through which fluids may be propelled by pressure changes developed by said standing wave, and pressure disturbance means in pressure transmitting relationship with said fluid column operative at a resonant frequency of said fluid column to establish a resonant standing wave therein, said reflecting means establishing a pressure anti-node of said standing wave adjacent said one end of said fluid column, and said fluid opening establishing a velocity anti-node of said standing wave substantially nearer to said other end of said column than to said one end, said fluid opening directing a net flow of fluid therefrom propelled in response to pressure variations of said standing wave.

10. An apparatus of the character described which includes: a housing defining and containing a column of fluid adapted to have a standing wave established therein, pressure wave reflecting means at one end of said column, a divergent chamber embodied in said housing terminating the other end of said column, and pressure disturbance means in pressure transmitting relationship with said fluid column operative at a resonant frequency of said fluid column to establish a resonant standing wave therein, said reflecting means establishing a pressure anti-node of said standing wave adjacent said one end of said fluid column, said divergent chamber functioning as a wave expanding means at the terminal portion of said column to establish a velocity anti-node of said standing wave substantially nearer to said other end of said column than to said one end, and inflow and outflow fluid passage means in said housing directing a net flow of fluid which is propelled in response to pressure variations of said standing wave.

11. An apparatus of the character described which includes: a housing defining and containing a divergent fluid column, said divergence providing wave expansion toward the larger end of said column, pressure wave reflecting means at the smaller end of said column, pressure disturbance means in pressure transmitting relationship with said fluid column operative at a resonant frequency of said fluid columun to establish a resonant standing wave therein, said reflecting means establishing a pressure anti-node of said standing wave adjacent said one end of said fluid column, and said wave expansion establishing a velocity anti-node of said standing wave substantially nearer to said larger end of said column than to said smaller end, and inflow and outflow fluid passage means in said housing directing a net flow of fluid which is propelled in response to pressure variations of said standing wave.

12. An apparatus of the character described which includes: a housing defining and containing a column of fluid adapted to have a standing wave established therein, pressure wave reflecting means at one end of said column, pressure wave expanding means including a fluid outlet embodied in said housing terminating the other end of said column, a fluid inlet opening to said one end of said column, and pressure disturbance means in pressure transmitting relationship with said fluid column operative at a resonant frequency of said fluid column to establish a resonant standing wave therein, said reflecting means establishing a pressure anti-node of said standing wave adjacent said one end of said fluid column, and said wave expanding means establishing a velocity anti-node of said standing wave substantially nearer to said other end of said column than to said one end.

13. An apparatus of the character described which includes: a housing defining and containing a column of fluid adapted to have a standing wave established therein, pressure wave reflecting means at one end of said column, pressure wave expanding means including a fluid outlet embodied in said housing terminating the other end of said column, a spring-loaded fluid intake check valve opening to said one end of said column, and pressure disturbance means in pressure transmitting relationship with said fluid column operative at a resonant frequency of said fluid column to establish a resonant standing wave therein, said reflecting means establishing a pressure anti-node of said standing wave adjacent said one end of said fluid column, and said wave expanding means establishing a velocity anti-node of said standing wave substantially nearer to said other end of said column than to said one end.

14. An apparatus of the character described which includes: a housing defining and containing a column fluid adapted to to have a standing wave established therein, pressure wave reflecting means at one end of said column, a capacitance chamber embodied in said housing at the other end of said column, a fluid inlet opening to said one end of said column, a fluid outlet leading from said capacitance chamber, and pressure disturbance means in pressure transmitting relationship with said fluid column operative at a resonant frequency of said fluid column to establish a resonant standing wave therein, said reflecting means establishing a pressure anti-node of said standing wave adjacent said one end of said fluid column, said capacitance chamber being adapted to effect a wave expansion establishing a velocity anti-node of said standing wave substantially nearer to said other end of said column than to said one end.

15. A device as defined in claim 6, wherein said pressure disturbance means embodies a means for intermittently burning increments of fuel at said resonant frequency.

16. A device as defined in claim 6, wherein said pressure disturbance means embodies a means for intermittently burning increments of fuel at said resonant frequency within said housing in the region of said one end of said column.

17. An apparatus of the character described which includes: a fluid-filled wave conduit having a closure providing a reflector at one end and a fluid opening providing wave expansion at the other end adapted to resonate with a standing wave created in said fluid having a pressure anti-node near said one end and a velocity anti-node near said other end, and means for generating pressure pulses in the fluid in said conduit at the resonant frequency for said standing wave to establish and maintain said standing wave and cause a net flow of fluid to be propelled from said fluid opening in response to fluid pressure variations of said standing wave.

18. An apparatus of the character described which includes: a fluid-filled wave conduit having a closure providing a reflector at one end and a flared fluid opening providing wave expansion at the other end adapted to resonate with a standing wave created in said fluid having a pressure anti-node near said one end and a velocity anti-node near said other end, and means for generating pressure pulses in the fluid in said conduit at the resonant frequency for said standing wave to establish and maintain said standing wave and cause a net flow of fluid to be propelled from said fluid opening in response to fluid pressure variations of said standing wave.

19. An apparatus of the character described which includes: a housing defining and containing a column of fluid adapted to have a standing wave established therein, pressure wave reflecting means at one end of said column, a capacitance chamber embodied in said housing at the other end of said column, a fluid inlet opening to said one end of said column, a fluid outlet leading from said capacitance chamber, a spring loaded check valve controlling said outlet, and pressure disturbance means in pressure transmitting relationship with said fluid column operative at a resonant frequency of said fluid column to establish a resonant standing wave therein, said reflecting means establishing a pressure anti-node of said standing wave adjacent said one end of said fluid column, said capacitance chamber being adapted to effect a wave expansion establishing a velocity anti-node of said standing wave substantially nearer to said other end of said column than to said one end.

20. An apparatus of the character described which includes: a housing defining and containing a column of fluid adapted to have a standing wave established therein, pressure wave reflecting means at one end of said column, a capacitance chamber embodied in said housing at the other end of said column, a spring-loaded fluid intake check-valve opening to said one end of said columns, said check-valve opening to admit fluid in response to rarefaction at said one end of said column caused by said standing wave, a restricted fluid outlet leading from said capacitance chamber, and pressure disturbance means in pressure transmitting relationship with said fluid column operative at a resonant frequency of said fluid column to establish a resonant standing wave therein, said reflecting means establishing a pressure anti-node of said standing wave adjacent said one end of said fluid column, said capacitance chamber being adapted to effect a wave expansion establishing a velocity anti-node of said standing wave substantially nearer to said other end of said column than to said one end.

21. An apparatus of the character described which includes: a fluid-filled wave conduit having a closure providing a reflector at one end and a fluid opening providing wave expansion at the other end adapted to resonate with a standing wave created in said fluid having a pressure anti-node near said one end and a velocity anti-node near said other end, a fluid inlet opening to said one end of said conduit, and means for generating pressure pulses in the fluid in said conduit at the resonant frequency for said standing wave to establish and maintain said standing wave and cause fluid to be propelled through said fluid opening in response to fluid pressure variations of standing wave.

22. In combination in a propulsive system: a cylinder; a piston reciprocable in said cylinder to provide a combustion zone of varying volume; means for admitting fuel and air to said cylinder and for igniting same; resonant sonic column means containing a fluid column adapted to have a standing wave established therein and comprising a tube closed at one end to provide a pressure anti-node of said standing wave thereadjacent and having at its far extremity a pressure wave expanding means establishing a velocity anti-node thereadjacent; means for transmitting pressure between said combustion zone and said closed end of said tube, said fluid column being of such length as to be resonated by pressure pulses delivered by said means from said combustion zone and created by intermittent ignition of fuel in said combustion zone; and said tube having fluid inflow and outflow passage means directing a net flow of fluid which is propelled in response to pressure variations of said standing wave.

23. In an apparatus for producing a propulsive thrust by use of sonic principles, the combination of: a resonant sonic column means adapted to have a standing wave established therein and comprising a tube closed at one end to provide a pressure anti-node of said standing wave thereadjacent and having an opening at the far extremity to provide a velocity anti-node of said standing wave thereadjacent, there being a combustion zone at said closed end, said tube containing combustion products comprising a fluid column; and means for successively admitting a combustible charge to said combustion zone and for exploding same therein at the frequency of said standing wave so as to resonate said fluid column, said tube including fluid inflow and outflow passage means directing a net flow of fluid which is propelled in response to pressure variations of said standing wave.

24. In an apparatus for producing a propulsive thrust; a sonic column means comprising a fluid-filled tube closed at one end and open at the other; and pressure pulse means for resonating said sonic column and establishing a standing wave therein, said pressure pulse means being disposed in a plane normal to the axis of the column near the closed end thereof to generate plane waves therein, said tube including fluid inflow and outflow passage means directing a net flow of fluid which is propelled in response to pressure variations of said standing wave.

25. A combination as defined in claim 24 in which said pressure pulse means consists of means for intermittently introducing a combustible charge distributed in a plane normal to the axis of said sonic column near said closed end; and ignition means for igniting said combustible charge.

26. A sonic jet propulsion system, including in combination: a pipe containing a column of fluid and having an intake portion near one end and a discharge portion near the other end; means for establishing a standing sound wave in said fluid column with a pressure anti-node region adjacent said intake portion and a velocity anti-node region adjacent said discharge portion, said means including means for intermittently supplying fluid to said intake portion in step with the appearance of minimum pressure at said intake portion; and a rearwardly-directed jet propulsion nozzle at said discharge portion for discharging a jet of fluid from said pipe.

27. A sonic internal-combustion jet-propulsion system, including in combination: a pipe containing a column of fluid and having an intake portion near one end and a discharge portion near the other end; means for establishing a standing sound wave in said fluid column with a pressure anti-node region adjacent said intake portion and a velocity anti-node region adjacent said discharge portion, said means including intake means for supplying increments of fuel and air to said intake portion in step with the appearance of minimum pressure at said intake portion and for burning said increments of fuel; and a jet propulsion nozzle at said discharge portion for discharging a jet of combustion products from said pipe in a direction rearward from the direction of desired thrust, said propulsion nozzle being sufficiently restricted with respect to the size of said intake means to maintain a high mean pressure in said fluid column.

28. A combination as defined in claim 27, in which said nozzle and said pipe are axially parallel.

29. A sonic jet propulsion system, including in combination: a pipe containing a column of gas and providing a combustion chamber at one end and an opening at the other end; and means for establishing a standing wave in said column of gas with a pressure anti-node region adjacent said combustion chamber and a velocity anti-node region near said opening, said means including a plurality of intake valves for separately admitting a stream of air and a stream comprising fuel to said combustion chamber during a rarefaction period at said pressure anti-node.

30. A sonic jet propulsion system, including in combination: a pipe containing a column of gas and providing a combustion chamber at one end and an opening at the other end; and means for establishing a standing wave in said column of gas with a pressure anti-node region adjacent said combustion chamber and a velocity anti-node region near said opening, said means including a plurality of intake valves for admitting a stream of air to said pipe adjacent said combustion chamber but in such manner that a major portion of the stream enters said pipe without passage through said combustion chamber and for separately admitting a fuel-containing stream of air to said combustion chamber during a rarefaction period at said pressure anti-node.

31. A sonic jet propulsion system, including in combination: a pipe containing a column of gas and closed at one end and having an opening at the other end; walls defining an offset combustion chamber at said closed end but openly communicating with said column of gas; means for delivering a first portion of air to said closed end of said pipe in such manner that a portion of this air moves directly into said pipe without passage through said combustion chamber; and means for delivering a second portion of air and fuel to said combustion chamber for intermittent combustion and discharge of the products of combustion into said column of gas while said column contains air from said first portion of air, said combustion establishing a standing wave in said column of gas with a pressure anti-node region near said closed end of said pipe and a velocity anti-node region near said open end.

32. A sonic, compression-ignition, jet-propulsion system, including in combination: a fluid filled pipe closed at one end and open at the other end; valve means for supplying fuel and air to said closed end when the pressure at said closed end is reduced to a low value; means for establishing a high-energy standing sound wave in said fluid column with a pressure anti-node region near said closed end, the minimum value of pressure in said pressure anti-node being at least as low as said low value of said pressure whereby fuel and air enter said closed end, the maximum value of said pressure adjacent said pressure anti-node region being sufficient to ignite said fuel by compression; and a jet orifice at said discharge open end of said pipe, said discharge orifice being sufficiently restricted to maintain a high mean pressure in said fluid column.

33. A sonic jet propulsion system, including in combination: a pipe containing a column of gas and having one closed end and the other end open and providing a combustion zone within said pipe adjacent said closed end; means for periodically burning fuel in said combustion zone to establish a standing wave in said column of gas with a pressure anti-node region near said combustion zone and a velocity anti-node region near said open end, said means including an inlet valve communicating with said combustion zone, a source of air under pressure communicating with said inlet valve for periodically delivering air to said combustion zone, means for delivering fuel to said combustion zone to form a combustible mixture, and means for initiating combustion of said combustible mixture in said combustion zone, said source of air under pressure forcing air into said combustion zone through said intake valve under pressure greater than that of the surrounding atmosphere to maintain a high mean pressure in said pipe.

34. A combination as defined in claim 33, in which said source of air under pressure comprises an air pump.

35. A combination as defined in claim 33, in which said source of air under pressure comprises a forwardly-facing air scoop.

36. A combination as defined in claim 33, in which said source of air under pressure comprises a resonating intake pipe communicating with said intake valve.

37. A sonic jet propulsion system, including in combination: a pipe closed at one end to provide a combustion chamber, said pipe containing a column of fluid; walls defining an enlarged capacitance chamber at the other end of said pipe, said capacitance chamber being in open communication with said column of fluid; a jet discharge orifice communicating with said capacitance chamber; and means for establishing a standing wave in said fluid column with a zone of large pressure variation adjacent said combustion zone and a zone of small pressure variation and substantial velocity variation at the point of communication of said pipe and said capacitance chamber, said means including means for admitting and burning increments of fuel in said combustion chamber to establish and maintain said standing wave.

38. A combination as defined in claim 31, including an enlarged capacitance chamber communicating at one position with said zone of small pressure variation and at another position with said jet discharge means.

39. A compression-ignition, jet-propulsion system as defined in claim 32, including walls defining a capacitance chamber at said discharge portion of said pipe, said capacitance chamber being of substantially larger cross-sectional area than said pipe, and in which said jet discharge orifice communicates with said capacitance chamber.

40. A sonic internal combustion, jet propulsion system, including in combination: a fluid-filled pipe closed at one end to form a combustion zone and opening at the other end to form a jet propulsion nozzle; a pressure-operated intake valve means communicating with said combustion zone and providing a seat and a valve member elestically urged thereagainst; and means for intermittently burning increments of fuel in said combustion zone in such manner as to establish a standing wave within said pipe with a zone of large pressure variation adjacent said combustion zone, the pressure variations in said combustion zone being sufficient to actuate said intake valve, said valve means having a natural period of vibration not less than that of the standing wave.

41. A sonic internal combustion jet propulsion system including in combination: a fluid filled pipe closed at one end and open at the other end; and means for intermittently burning increments of fuel within said closed end of said pipe at such frequency as to establish a standing wave in the contained fluid with a pressure anti-node region near said closed end and a velocity anti-node region near said open end.

42. A sonic jet propulsion system including in combination a fluid filled pipe closed at one end to form a combustion zone and open at the other end to form a jet discharge nozzle; means for intermittently burning a combustible charge in said combustion zone in such manner as to resonate the fluid within said pipe and established therein a standing wave with a pressure anti-node region near said combustion zone end and a velocity anti-node region near said nozzle end, valve means for permitting the intake of fluid into said combustion zone during rarefaction periods at said pressure anti-node region; and an air scoop facing the air stream created by relative movement between the pipe and atmosphere and communicating with said valve means.

ALBERT G. BODINE, Jr.

REFERENCES CITED

The following references are of record in the file of this patent:

UNITED STATES PATENTS

| Number | Name | Date |
|---|---|---|
| 1,021,521 | Heroult | Mar. 26, 1912 |
| 1,834,473 | Ricardo | Dec. 1, 1931 |
| 2,041,081 | Menzies | May 19, 1936 |
| 2,062,013 | Opolo | Nov. 24, 1936 |
| 2,102,559 | Kadenacy | Dec. 14, 1937 |

FOREIGN PATENTS

| Number | Country | Date |
|---|---|---|
| 27,724 | Great Britain | Dec. 16, 1907 |
| 2,209 | Great Britain | Jan. 31, 1908 |
| 147,026 | Great Britain | Oct. 6, 1921 |
| 176,838 | Great Britain | Mar. 6, 1922 |
| 188,642 | Great Britain | Nov. 29, 1923 |
| 424,955 | Great Britain | Dec. 1, 1933 |
| 412,478 | France | May 3, 1910 |
| 549,389 | France | Nov. 18, 1922 |
| 1,657 | Netherlands | Nov. 1, 1916 |